US008024162B2

(12) United States Patent  (10) Patent No.: US 8,024,162 B2
Seko et al.  (45) Date of Patent: Sep. 20, 2011

(54) PARTICLE BEHAVIOR ANALYSIS METHOD, PARTICLE BEHAVIOR ANALYSIS APPARATUS, AND COMPUTER READABLE STORAGE MEDIUM

(75) Inventors: Tomohiro Seko, Kanagawa (JP); Toshiroh Shimada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1015 days.

(21) Appl. No.: 11/486,145

(22) Filed: Jul. 14, 2006

(65) Prior Publication Data

US 2007/0174029 A1   Jul. 26, 2007

(30) Foreign Application Priority Data

Jan. 20, 2006   (JP) .............................. P2006-011899

(51) Int. Cl.
*G06G 7/48*  (2006.01)
(52) U.S. Cl. .......................................................... 703/6
(58) Field of Classification Search .................. 703/2, 9, 703/6
See application file for complete search history.

(56) References Cited

FOREIGN PATENT DOCUMENTS

JP    2005-122354    5/2005

OTHER PUBLICATIONS

S. J. Plimpton, R. Pollock, M. Stevens, "Particle-Mesh Ewald and rRESPA for Parallel Molecular Dynamics Simulations" in Proc of the Eighth SIAM Conference on Parallel Processing for Scientific Computing, Minneapolis, MN, Mar. 1997, 13 pages.*
Shu Jiwu, Wang Bing, Wang Jinzhao, et al. Optimization techniques for parallel force-decomposition algorithm in molecular dynamic simulations. Computer Physics Communications, 2003, 154(2): 121-130.*
Steve Plimpton et al., "A New Parallel Method for Molecular Dynamics Simulation of Macromolecular Systems," *Journal of Computational Chemistry*, vol. 17, No. 3, pp. 326-337, 1996.
Laxmikant Kalé et al., "NAMD2: Greater Scalability for Parallel Molecular Dynamics," *Journal of Computational Physics*, 151, pp. 283-312, 1999.
Takahiro Watanabe, "Development of 3-D Particle Simulator for Analysis of Phenomena in Electrophotography," *Japan Hardcopy 2003*, pp. 269-272, 2003.

* cited by examiner

*Primary Examiner* — Jason Proctor
*Assistant Examiner* — Luke Osborne
(74) *Attorney, Agent, or Firm* — Morgan, Lewis & Bockius LLP

(57) ABSTRACT

A particle behavior analysis method uses plural computers connected via a network to analyze particle behavior considering an interaction force with a different substance acting on a particle. The method includes analyzing the particle behavior by using a force decomposition paralleling algorithm using a force matrix considering at least two or more types of interaction forces.

9 Claims, 21 Drawing Sheets

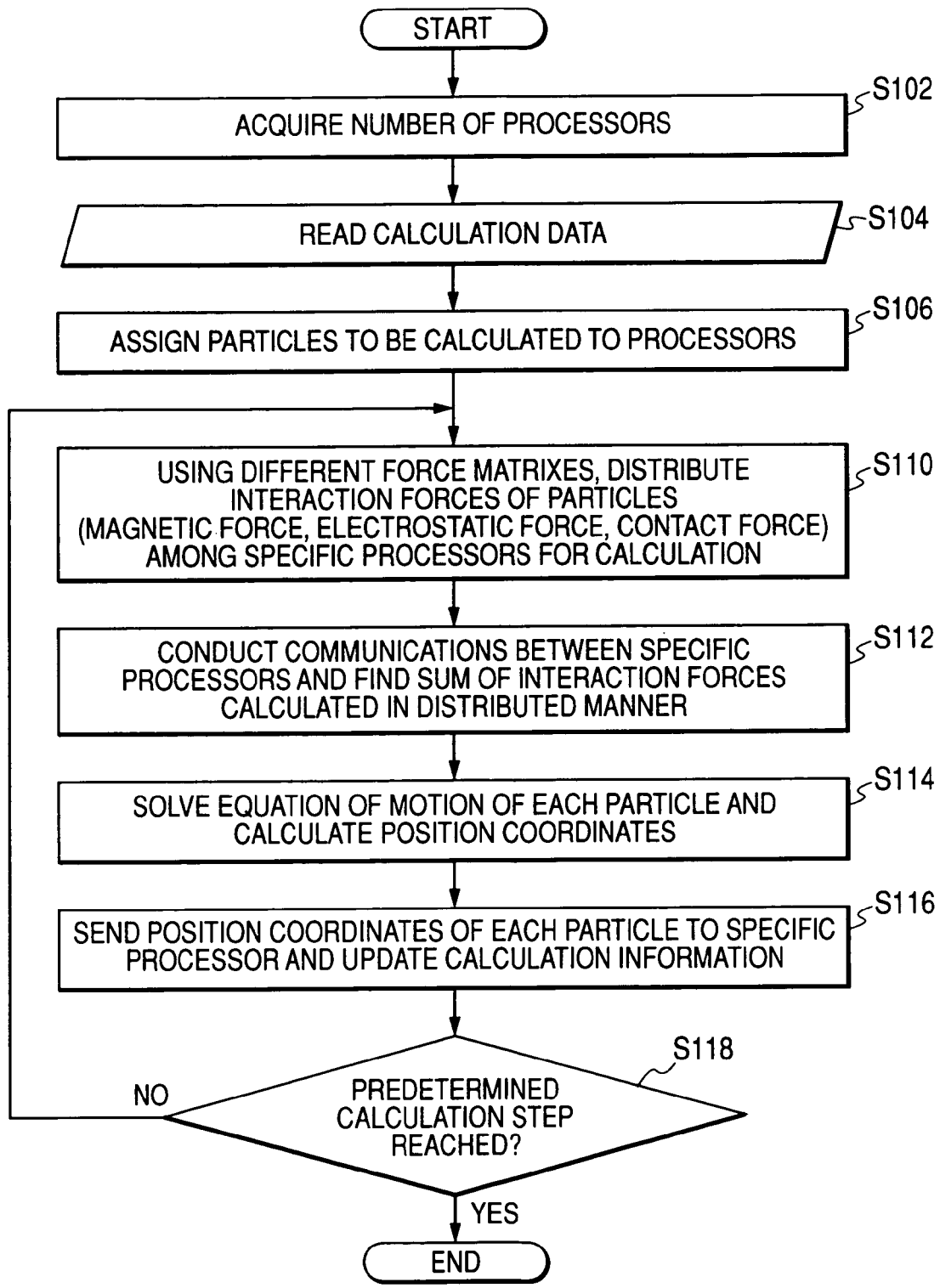

FIG. 7

| NODE NUMBER/ PARTICLE NUMBER | NODE NUMBER/ | 0 | 4 | 8 | 12 | 1 | 5 | 9 | 13 | 2 | 6 | 10 | 14 | 3 | 7 | 11 | 15 |
|---|---|---|---|---|---|---|---|---|---|---|---|---|---|---|---|---|---|
| | | 0 | 1 | 16 | 24 | 2 | 10 | 18 | 26 | 4 | 12 | 20 | 28 | 6 | 14 | 22 | 30 |
| | | 0 | 1 | 17 | 25 | 3 | 11 | 19 | 27 | 5 | 13 | 21 | 29 | 7 | 15 | 23 | 31 |
| | | 0 | 1 | 2 | 3 | 4 | 5 | 6 | 7 | 0 | 1 | 2 | 3 | 4 | 5 | 6 | 7 |
| 0 | 0 | | | | | | | | | | | | | | | | |
| | 1 | | | | | | | | | | | | | | | | |
| 1 | 2 | | | | | | | | | | | | | | | | |
| | 3 | | INTERACTION MATRIX OF #0 NODE | | | | INTERACTION MATRIX OF #1 NODE | | | | INTERACTION MATRIX OF #2 NODE | | | | INTERACTION MATRIX OF #3 NODE | | |
| 2 | 4 | | | | | | | | | | | | | | | | |
| | 5 | | | | | | | | | | | | | | | | |
| 3 | 6 | | | | | 6-24 6-25 | | | | | | | | | | | |
| | 7 | | | | | | | | | | | | | | | | |
| 4 | 8 | | | | | | | | | 8-4 | 8-5 8-12 8-13 8-20 8-21 8-28 8-29 | | | | | | |
| | 9 | | INTERACTION MATRIX OF #4 NODE | | | | INTERACTION MATRIX OF #5 NODE | | | 9-4 | 9-5 9-12 9-13 9-20 9-21 9-28 9-29 | | | | INTERACTION MATRIX OF #7 NODE | | |
| 5 | 10 | | | | | | | | | 10-4 | 10-5 10-12 10-13 10-20 10-21 10-28 10-29 | | | | | | |
| | 11 | | | | | | | | | 11-4 | | | | | | | |
| 6 | 12 | | | | | | | | | 12-4 | INTERACTION MATRIX OF #6 NODE | | | | | | |
| | 13 | | | | | | | | | 13-4 | | | | | | | |
| 7 | 14 | | | | | | | | | 14-4 | | | | | | | |
| | 15 | | | | | | | | | 15-4 | | | | | | | |
| 8 | 16 | | | | | | | | | | | | | | | | |
| | 17 | | INTERACTION MATRIX OF #8 NODE | | | | INTERACTION MATRIX OF #9 NODE | | | | INTERACTION MATRIX OF #10 NODE | | | | INTERACTION MATRIX OF #11 NODE | | |
| 9 | 18 | | | | | | | | | | | | | | | | |
| | 19 | | | | | | | | | | | | | | | | |
| 10 | 20 | | | | | | | | | | | | | | | | |
| | 21 | | | | | | | | | | | | | | | | |
| 11 | 22 | | | | | | | | | | | | | | | | |
| | 23 | | | | | | | | | | | | | | | | |
| 12 | 24 | | | | | | | | | | | | | | | | |
| | 25 | | INTERACTION MATRIX OF #12 NODE | | | | INTERACTION MATRIX OF #13 NODE | | | | INTERACTION MATRIX OF #14 NODE | | | | INTERACTION MATRIX OF #15 NODE | | |
| 13 | 26 | | | | | | | | | | | | | | | | |
| | 27 | | | | | | | | | | | | | | | | |
| 14 | 28 | | | | | | | | | | | | | | | | |
| | 29 | | | | | | | | | | | | | | | | |
| 15 | 30 | | | | | | | | | | | | | | | | |
| | 31 | | | | | | | | | | | | | | | | |

FIG. 8

STEP S112: ADD TOGETHER INTERACTIONS IN ROW DIRECTION IN FORCE MATRIX
(EXAMPLE: INTERACTIONS OF MAGNETIC FORCE)

| NODE NUMBER/i | NODE NUMBER/j PARTICLE NUMBER | 0 | | | | 1 | | | | 2 | | | | 3 | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | 0; C | | | | | | | | | | | | | | | | |
| | 1; C | | | | | | | | | | | | | | | | |
| | 2; C | INTERACTION MATRIX OF #0 NODE | | | | INTERACTION MATRIX OF #1 NODE | | | | | | | | | | | |
| | 3; C | | | | | | | | | | | | | | | | |
| 1 | 4; C | | | | | | | | | | | | | | | | |
| | 5; C | | | | | | | | | | | | | | | | |
| | 6; C | | | | | | | | | | | | | | | | |
| | 7; C | | | | | | | | | | | | | | | | |
| 2 | 8; C | | | | | | | | | | | | | | | | |
| | 9; C | | | | | | | | | | | | | | | | |
| | 10; C | INTERACTION MATRIX OF #2 NODE | | | | INTERACTION MATRIX OF #3 NODE | | | | | | | | | | | |
| | 11; C | | | | | | | | | | | | | | | | |
| 3 | 12; C | | | | | | | | | | | | | | | | |
| | 13; C | | | | | | | | | | | | | | | | |
| | 14; C | | | | | | | | | | | | | | | | |
| | 15; C | | | | | | | | | | | | | | | | |

ALL FOUR NODES
THE TOTAL NUMBER OF PARTICLES TO BE ANALYZED IS 16
ALL ARE CARRIER PARTICLES 102a (0; C TO 15; C)
TONER PARTICLES (16; T TO 31; T) ARE NOT CONTAINED
FOUR PARTICLES PER NODE ARE DISTRIBUTED AMONG NODES

FIG. 9

STEP S112: ADD TOGETHER INTERACTIONS IN ROW DIRECTION IN FORCE MATRIX
(EXAMPLE: INTERACTIONS OF ELECTROSTATIC FORCE)

| NODE NUMBER/i | NODE NUMBER/j | 0 | | | | 1 | | | | 2 | | | | 3 | | | |
|---|---|---|---|---|---|---|---|---|---|---|---|---|---|---|---|---|---|
| | PARTICLE NUMBER | 16 | 17 | 18 | 19 | 20 | 21 | 22 | 23 | 24 | 25 | 26 | 27 | 28 | 29 | 30 | 31 |
| 0 | 16; T | | | | | | | | | | | | | | | | |
| | 17; T | | | | | | | | | | | | | | | | |
| | 18; T | | | | | | | | | | | | | | | | |
| | 19; T | INTERACTION MATRIX OF #0 NODE | | | | | | | | INTERACTION MATRIX OF #1 NODE | | | | | | | |
| 1 | 20; T | | | | | | | | | | | | | | | | |
| | 21; T | | | | | | | | | | | | | | | | |
| | 22; T | | | | | | | | | | | | | | | | |
| | 23; T | | | | | | | | | | | | | | | | |
| 2 | 24; T | | | | | | | | | | | | | | | | |
| | 25; T | | | | | | | | | | | | | | | | |
| | 26; T | INTERACTION MATRIX OF #2 NODE | | | | | | | | INTERACTION MATRIX OF #3 NODE | | | | | | | |
| | 27; T | | | | | | | | | | | | | | | | |
| 3 | 28; T | | | | | | | | | | | | | | | | |
| | 29; T | | | | | | | | | | | | | | | | |
| | 30; T | | | | | | | | | | | | | | | | |
| | 31; T | | | | | | | | | | | | | | | | |

ALL FOUR NODES
THE TOTAL NUMBER OF PARTICLES TO BE ANALYZED IS 16
ALL ARE TONER PARTICLES (16; T TO 31; T)
CARRIER PARTICLES (0; C TO 15; C) ARE NOT CONTAINED
FOUR PARTICLES PER NODE ARE DISTRIBUTED AMONG NODES

FIG. 10 STEP S112: ADD TOGETHER INTERACTIONS IN ROW DIRECTION IN FORCE MATRIX (EXAMPLE: INTERACTIONS OF CONTACT FORCE)
HOW TO COMBINE PARTICLE NUMBERS OF MATED PARTICLES IS A POINT

| NODE NUMBER | PARTICLE NUMBER/j | 0 | 1 | 2 | 3 | 4 | 5 | 8 | 9 | 12 | 13 | 16 17 | 24 25 | 2 3 | 10 11 | 18 19 | 26 27 | 4 5 | 12 13 | 20 21 | 28 29 | 6 7 | 14 15 | 22 23 | 30 31 |
|---|---|---|---|---|---|---|---|---|---|---|---|---|---|---|---|---|---|---|---|---|---|---|---|---|---|
| 0 | 0; C  1; C | | | | | | | | | | | INTERACTION MATRIX OF #0 NODE | | INTERACTION MATRIX OF #1 NODE | | | | INTERACTION MATRIX OF #2 NODE | | | | INTERACTION MATRIX OF #3 NODE | | | |
| 1 | 2; C  3; C | | | | | | | | | | | | | | | | | | | | | | | | |
| 2 | 4; C  5; C | | | | | | | | | | | | 6-24 6-25 | | | | | | | | | | | | |
| 3 | 6; C  7; C | | | | | | | | | | | | | | | | | | | | | | | | |
| 4 | 8; C  9; C | | | | | | | | | | | INTERACTION MATRIX OF #4 NODE | | INTERACTION MATRIX OF #5 NODE | | | | INTERACTION MATRIX OF #6 NODE  8-12 8-13 8-20 8-21 8-28 8-29  9-12 9-13 9-20 9-21 9-28 9-29  10-12 10-13 10-20 10-21 10-28 10-29 | | | | INTERACTION MATRIX OF #7 NODE | | | |
| 5 | 10; C  11; C | | | | | 8-4  9-4  10-4  11-4  12-4  13-4  14-4  15-4 | 8-5  9-5  10-5 | | | | | | | | | | | | | | | | | | |
| 6 | 12; C  13; C | | | | | | | | | | | | | | | | | | | | | | | | |
| 7 | 14; C  15; C | | | | | | | | | | | | | | | | | | | | | | | | |
| 8 | 16; T  17; T | | | | | | | | | | | INTERACTION MATRIX OF #8 NODE | | INTERACTION MATRIX OF #9 NODE | | | | INTERACTION MATRIX OF #10 NODE | | | | INTERACTION MATRIX OF #11 NODE | | | |
| 9 | 18; T  19; T | | | | | | | | | | | | | | | | | | | | | | | | |
| 10 | 20; T  21; T | | | | | | | | | | | | | | | | | | | | | | | | |
| 11 | 22; T  23; T | | | | | | | | | | | | | | | | | | | | | | | | |
| 12 | 24; T  25; T | | | | | | | | | | | INTERACTION MATRIX OF #12 NODE | | INTERACTION MATRIX OF #13 NODE | | | | INTERACTION MATRIX OF #14 NODE | | | | INTERACTION MATRIX OF #15 NODE | | | |
| 13 | 26; T  27; T | | | | | | | | | | | | | | | | | | | | | | | | |
| 14 | 28; T  29; T | | | | | | | | | | | | | | | | | | | | | | | | |
| 15 | 30; T  31; T | | | | | | | | | | | | | | | | | | | | | | | | |

$N/\sqrt{P} = 32/\sqrt{16} = 8$

PROCESSING IS APPLIED TO CONTACT FORCE ACTING ON EACH OF CARRIER PARTICLES AND TONER PARTICLES

FIG. 11 STEP S112: ADD TOGETHER INTERACTIONS IN ROW DIRECTION IN FORCE MATRIX (EXAMPLE: INTERACTIONS OF MAGNETIC FORCE)

| NODE NUMBER j | | 0 | | 1 | | 2 | | 3 | | 4 | | 5 | | 6 | | 7 | |
|---|---|---|---|---|---|---|---|---|---|---|---|---|---|---|---|---|---|
| NODE NUMBER i | PARTICLE NUMBER | 0 | 4 | 8 | 12 | 1 | 5 | 9 | 13 | 2 | 6 | 10 | 14 | 3 | 7 | 11 | 15 |
| | | 0 | 1 | 8 9 | 16 17 | 24 25 | 2 3 | 10 11 | 18 19 | 26 27 | 4 5 | 12 13 | 20 21 | 28 29 | 6 7 | 14 15 | 22 23 | 30 31 |
| 0 | 0 1 | INTERACTION MATRIX OF #0 NODE | | | | INTERACTION MATRIX OF #1 NODE | | | | INTERACTION MATRIX OF #2 NODE | | | | INTERACTION MATRIX OF #3 NODE | | | |
| 1 | 2 3 | | | | | | | | | | | | | | | | |
| 2 | 4 5 | | | | | | | | | | | | | | | | |
| 3 | 6 7 | 6-24 6-25 | | | | | | | | | | | | | | | |
| 4 | 8 9 | INTERACTION MATRIX OF #4 NODE | | | | INTERACTION MATRIX OF #5 NODE | | | | INTERACTION MATRIX OF #6 NODE | | | | INTERACTION MATRIX OF #7 NODE | | | |
| 5 | 10 11 | | | | | | | | | | | | | | | | |
| 6 | 12 13 | | | | | | | | | | | | | | | | |
| 7 | 14 15 | | | | | | | | | | | | | | | | |
| 8 | 16 17 | INTERACTION MATRIX OF #8 NODE | | | | INTERACTION MATRIX OF #9 NODE | | | | INTERACTION MATRIX OF #10 NODE | | | | INTERACTION MATRIX OF #11 NODE | | | |
| 9 | 18 19 | | | | | | | | | | | | | | | | |
| 10 | 20 21 | | | | | | | | | | | | | | | | |
| 11 | 22 23 | | | | | | | | | | | | | | | | |
| 12 | 24 25 | INTERACTION MATRIX OF #12 NODE | | | | INTERACTION MATRIX OF #13 NODE | | | | INTERACTION MATRIX OF #14 NODE | | | | INTERACTION MATRIX OF #15 NODE | | | |
| 13 | 26 27 | | | | | | | | | | | | | | | | |
| 14 | 28 29 | | | | | | | | | | | | | | | | |
| 15 | 30 31 | | | | | | | | | | | | | | | | |

SUM TOTAL OF MAGNETIC INTERACTION FORCES IS FOUND SENT TO NODE #6 AND ARE TOTALIZED IN NODE #6. ACCORDINGLY, SUM TOTAL OF MAGNETIC INTERACTION FORCES OF PARTICLES 12 AND 13 THAT NODE #6 TAKES CHARGE OF IS FOUND.

$N/\sqrt{P} = 32/\sqrt{16} = 8$

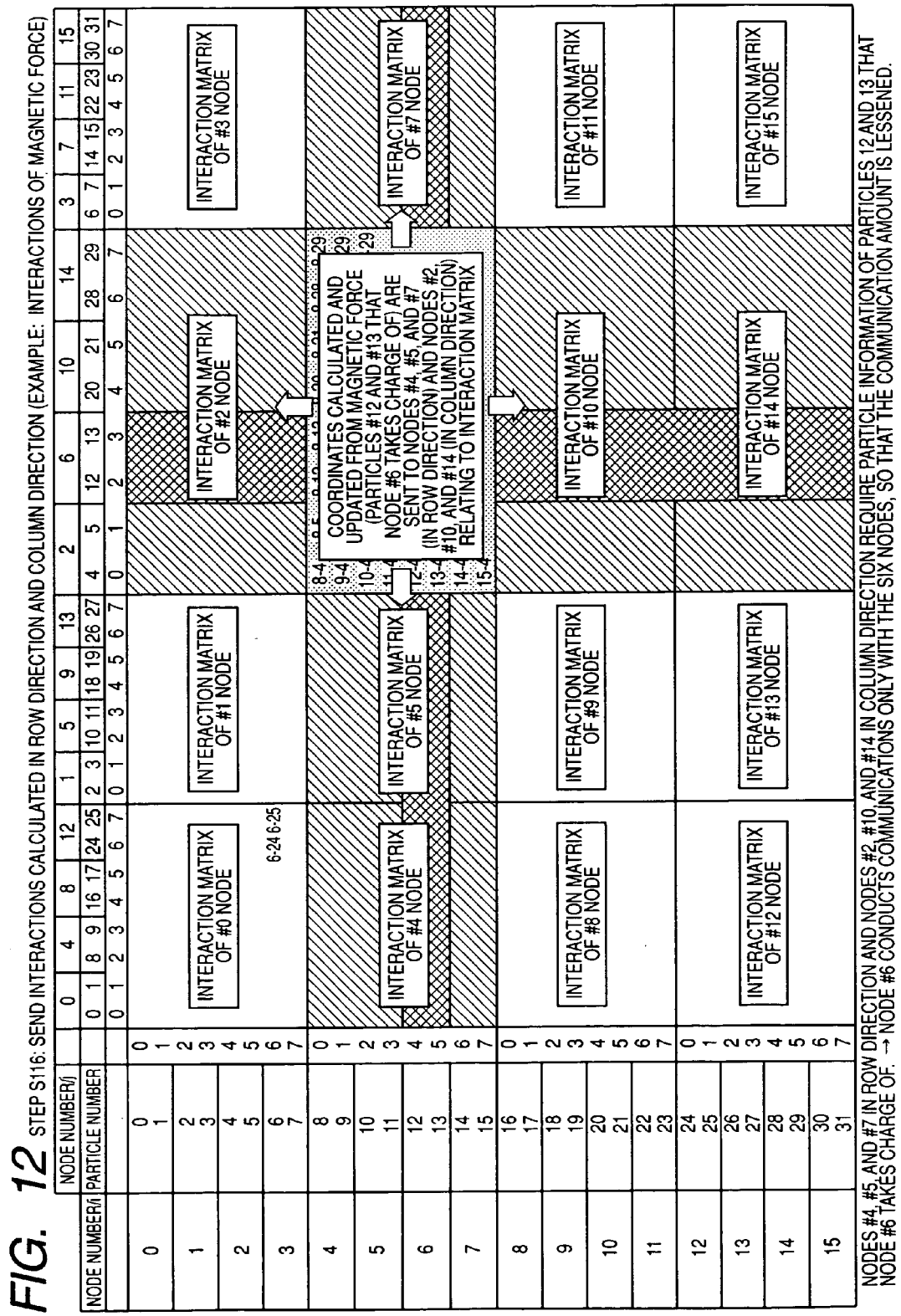

ANALYSIS START STATE

ANALYSIS END STATE

FIG. 14

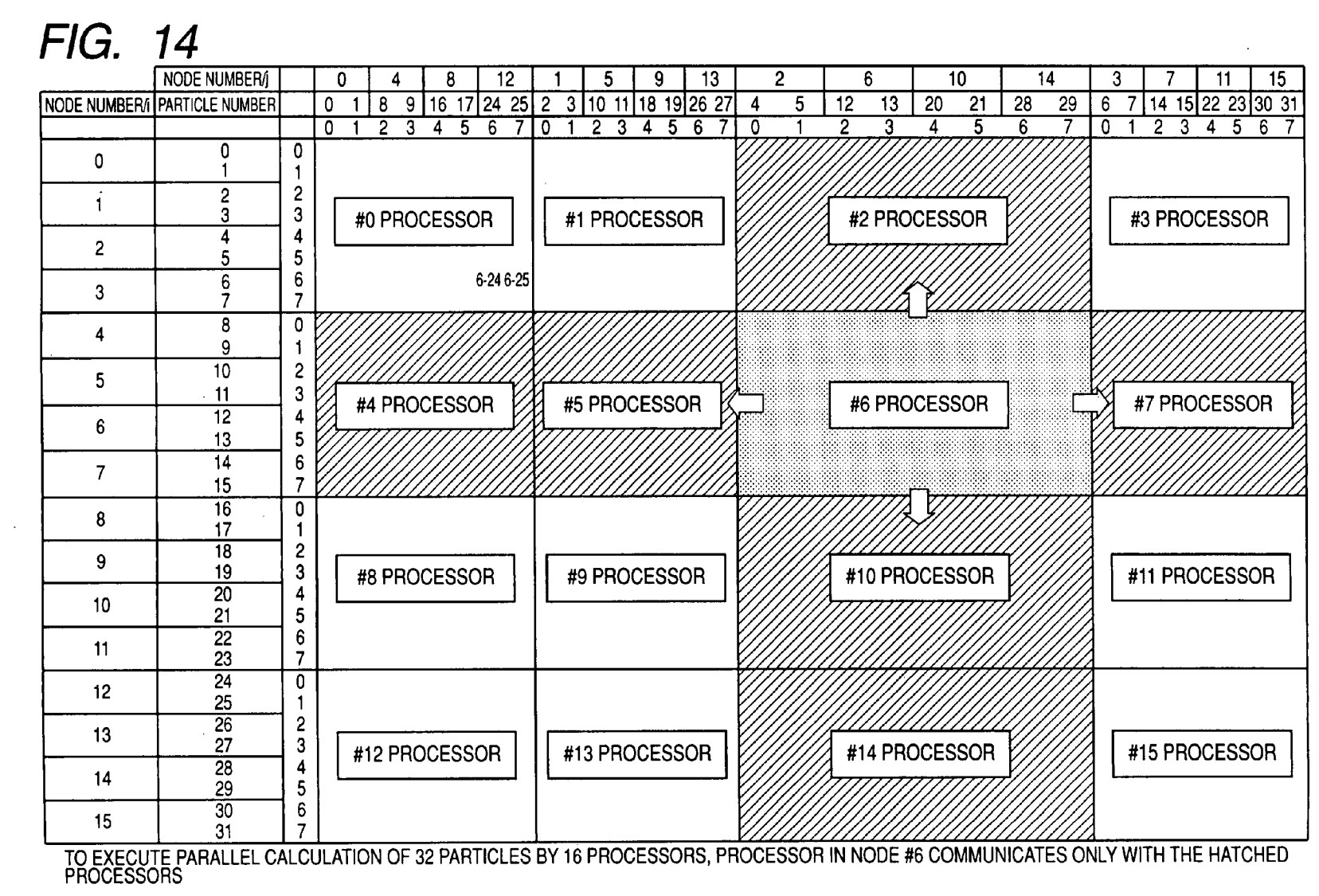

TO EXECUTE PARALLEL CALCULATION OF 32 PARTICLES BY 16 PROCESSORS, PROCESSOR IN NODE #6 COMMUNICATES ONLY WITH THE HATCHED PROCESSORS

SPEED IMPROVEMENT RATIO IN SPATIAL DECOMPOSITION
PARALLELING PROCESSING DESCRIBED IN THE RELATED ART

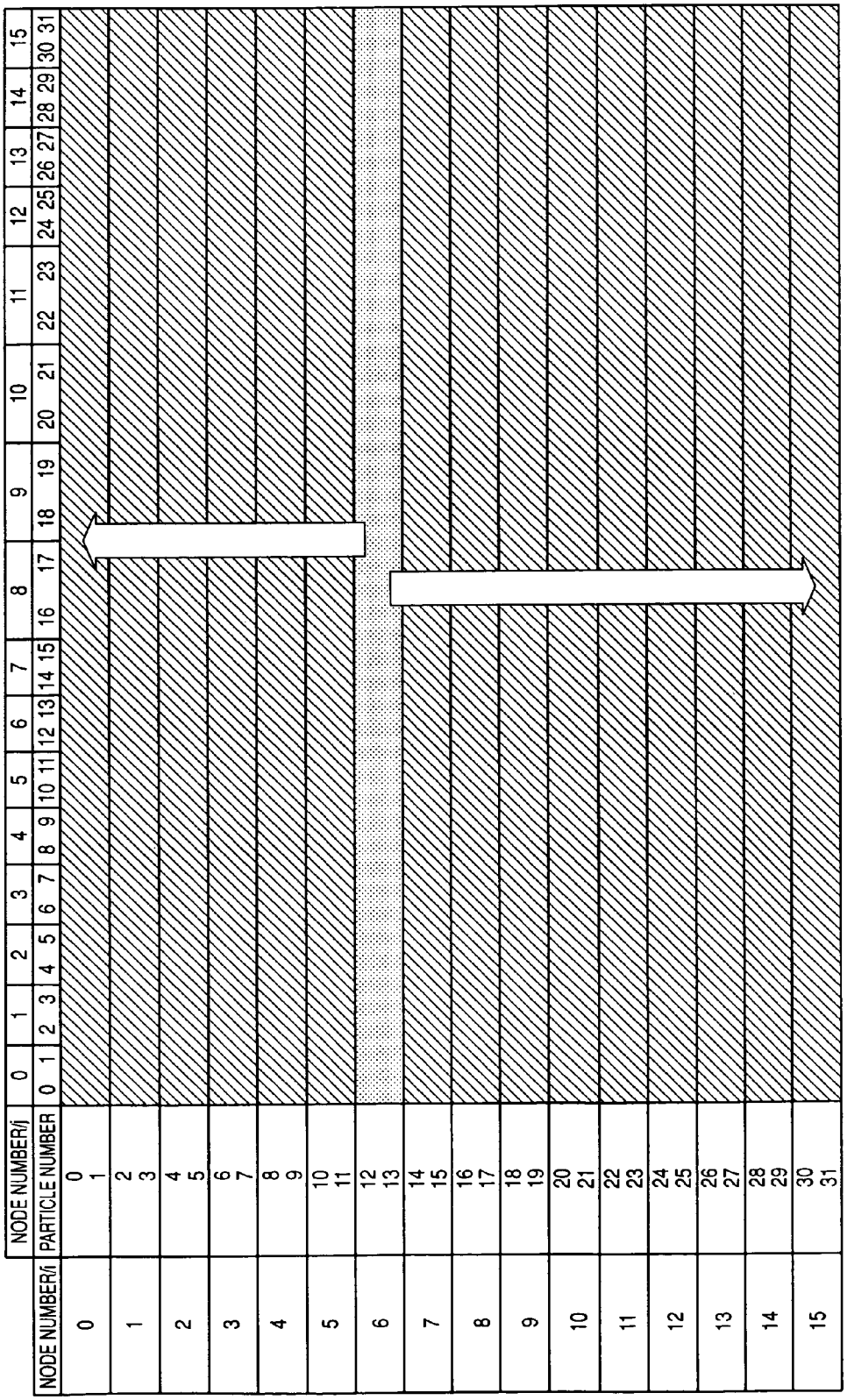

SPEED IMPROVEMENT RATIO COMPARISON BETWEEN FORCE
DECOMPOSITION PARALLELING PROCESSING AND SPATIAL
DECOMPOSITION PARALLELING PROCESSING (RELATED ART CASE)

PARTICLE BEHAVIOR ANALYSIS METHOD, PARTICLE BEHAVIOR ANALYSIS APPARATUS, AND COMPUTER READABLE STORAGE MEDIUM

BACKGROUND

1. Technical Field

This invention relates to a particle behavior analysis method, a particle behavior analysis apparatus, and a storage medium storing a particle behavior analysis program and more particularly to a mechanism for analyzing by simulation the particle behavior in a state in which particles are mixed in color material (powder, developer), etc., used in an image formation apparatus of a printer, a facsimile machine, a multiple function processing machine having the functions of a printer and a facsimile, or the like, for example.

2. Related Art

For example, to use an electrophotographic system in an image formation apparatus of a printer, a facsimile machine, a multiple function processing machine having the functions of a printer and a facsimile, or the like, generally, uniform electrostatic charges are given to the top of a photoconductive insulator such as a photoconductive drum and a light figure is applied to the top of the photoconductive insulator by various means, thereby forming an electrostatic latent image and then the formed latent image is developed and visualized with magnetic powder using a developing machine and the toner power image is transferred to a recording medium such as paper and then is fixed for providing printed matter.

In such an electrophotographic image formation apparatus, the behavior of magnetic powder stored in a vessel such as agitation, transport to a magnetic roller, attraction to a magnetic roller, or jetting to a photoconductor charged in response to a record image and formed with a latent image affects the image quality of the record image. Then, analysis of the behavior of the magnetic powder becomes important for developing an electrophotographic apparatus main unit and a developing unit.

For behavior simulation of particles such as powder and granules, a method called discrete element method or distinct element method becomes widespread. However, the analysis load grows approximately as the square of the number of particles in a particle behavior calculation algorithm based on the discrete element method and thus if the number of particles increases, the computation amount become enormous; even if the performance of a computer improves, it is often difficult to execute calculation on the number of particles equal to that in the actual system.

SUMMARY

According to an aspect of the present invention, a particle behavior analysis method uses plural computers connected via a network to analyze particle behavior considering an interaction force with a different substance acting on a particle. The method includes analyzing the particle behavior by using a force decomposition paralleling algorithm using a force matrix considering at least two or more types of interaction forces.

BRIEF DESCRIPTION OF THE DRAWINGS

Exemplary embodiments may be described in detail with reference to the accompanying drawings, in which:

FIG. 6 is a flowchart to show an example of a force decomposition parallel processing procedure;

FIG. 7 is a drawing to describe a technique of assigning particles to be analyzed to nodes;

FIG. 8 is a drawing to describe the interaction calculation targets in each node about the magnetic interaction;

FIG. 9 is a drawing to describe the interaction calculation targets in each node about the electrostatic interaction;

FIG. 10 is a drawing to describe the interaction calculation targets in each node about the mechanical interaction (contact force);

FIG. 11 is a drawing to describe addition processing of the interaction forces found in the nodes (particularly, in the row direction of the force matrix);

FIG. 12 is a drawing to describe other specific processors which need to communicate the interaction forces calculated in the row direction and the column direction;

FIG. 14 is a drawing to summarize processors to communicate when the force matrix in a force decomposition method is used with attention focused on node #6;

FIG. 16 is a drawing to describe the nodes to communicate in a particle decomposition method, a replicated data method;

DETAILED DESCRIPTION

<Outline of Developing Unit>

Figure 1A:
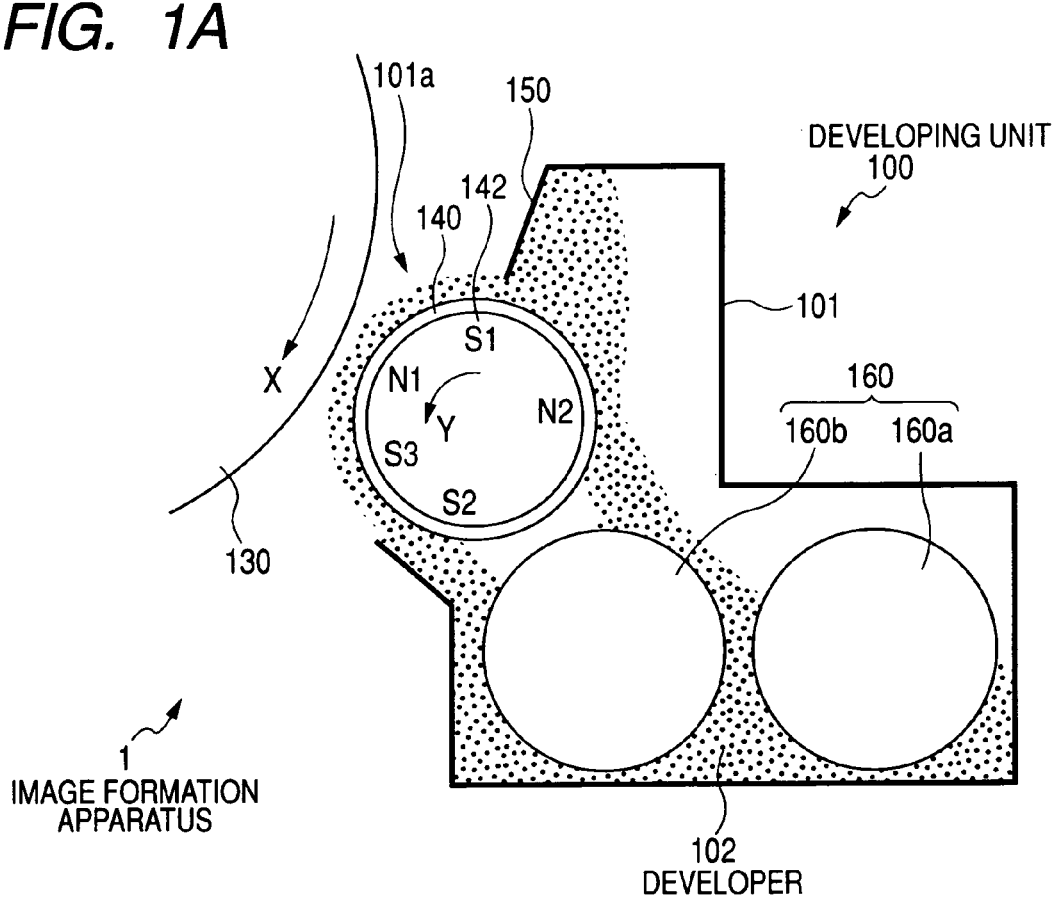
FIGS. 1A and 1B are drawings showing one configuration example of a developing unit.
Figure 1B:
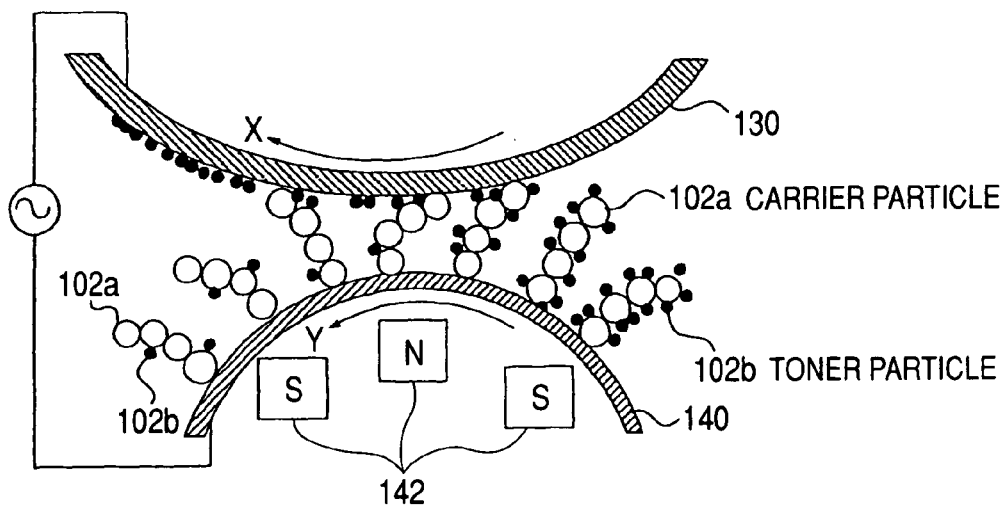

FIG. 1 is a drawing to show a configuration example of a developing unit 100 used with an image formation apparatus of a printer, a copier, etc.

As shown in FIG. 1 (A), the developing unit 100 is placed facing a photoconductor 130 and has a developer 102 filled into a storage vessel 101. The storage vessel 101 is formed with an opening 101a for jetting the developer 102 to the side of the photoconductor 130.

The developer 102 is a dual-component developer made up of carrier particles 102a and toner particles 102b (for example, black toner particles) different in physical properties and particle diameter, as shown in FIG. 1 (B). Magnetic powder is formed as a whole by pairs of the carrier particles 102a and the toner particles 102b. That is, the carrier particle 102a is made of a magnetic substance and is attracted to a magnet. On the other hand, the toner particle 102b is non-magnetic toner and is powder having a predetermined color. Generally, the particle diameter of the carrier particle 102a is larger than that of the toner particle 102b. Magnetic toner can also be used as the toner particle 102b.

In the storage vessel 101, a developing roll (also called a mag roll, a magnet roller, or a magnetic transport roller) 140 as an example of a support roll for supporting the developer 102 on a surface has a peripheral surface a little projected from the opening 101a. In the developing roll 140, a predetermined number of magnets 142 are placed at predetermined intervals along the inner peripheral margin.

The developing unit 100 includes a regulation blade (trimmer bar) 150 functioning as a height regulation member and a layer formation member in the proximity of the developing roll 140 for regulating the pile height of the developer 102 produced along the magnetic lines of force of the magnet 142.

The storage vessel 101 contains a pair of agitation and transport rolls 160 (160a and 160b) for agitating the developer 102 and transporting the developer 102 to the developing roll 140. One agitation and transport roll 160a is placed at the depth of the storage vessel 101 and the other agitation and transport roll 160b is placed facing the developing roll 140. The agitation and transport rolls 160 rotate, thereby transporting the developer 102 to the developing roll 140 while agitating the developer 102.

The developing roll 140 is rotated in the same direction as a move direction X of the photoconductor 130 (arrow Y direction) as the rotation move direction of the surface opposed to the photoconductor 130 together with the photoconductor 130 rotated in the arrow X direction. The developing roll 140 may be rotated in the opposite direction to the move direction X of the photoconductor 130.

The developing roll 140 contains the magnets 142. The developing roll 140 attracts the developer 102 by a magnetic force from the agitation and transport roll 160b. The attraction amount of the developer 102 attracted to the developing roll 140 is regulated by the regulation blade 150.

That is, the carrier particles 102a and the toner particles 102b are transported to the developing roll 140 while they are agitated by the agitation and transport roll 160 having an agitation function and are frictionally charged, and are deposited on the peripheral margin of the developing roll 140 at a given height by the regulation blade 150.

The toner particles 102b are attracted to the carrier particles 102a by an electrostatic force. The carrier particles 102a form a magnetic brush by a magnetic field from the magnets 142 contained in the developing roll 140. The toner particles 102b are transported to the portion opposed to the photoconductor 130 together with the carrier particles 102a.

The developing roll 140 is provided facing the photoconductor 130, and the toner particles 102b of the developer 102 attracted to the developing roll 140 are charged and are attracted to the photoconductor 130. At this time, an electrostatic latent image is formed on the surface of the photoconductor 130 as the surface of the photoconductor 130 is charged in response to a record image, and the toner particles 102b are attracted in response to the electrostatic latent image formed on the photoconductor 130.

That is, the developing roll 140 jets the toner particles 102b supported on the developing roll 140 through the carrier particles 102a to the photoconductor 130 for developing the latent image formed on the surface of the photoconductor 130. The carrier particles 102a after the processing and the toner particles 102b not jetted to the photoconductor 103 are collected in the storage vessel 101.

The surface of the photoconductor 130 is charged in response to the record image and the toner particles 102b are jetted to the surface of the photoconductor 130 by an electrostatic force, as shown in FIG. 1 (B). The jetted toner particles 102b are deposited on the surface of the photoconductor 130, forming a toner image responsive to the record image. At this time, the image quality of the record image depends on how the toner particles 102b are attracted to the photoconductor 130.

Since the toner particles 102b are transported to the photoconductor 130 by the carrier particles 102a, how the toner particles 102b are attracted to the photoconductor 130 is determined by the behavior of the carrier particles 102a and the toner particles 102b in the developing gap between the developing roll 140 and the photoconductor 130. Thus, analysis of the behavior of the carrier particles 102a and the toner particles 102b becomes an important element for developing the electrophotographic apparatus main unit and the developing unit 100.

Particle Behavior Analysis System

First Exemplary Embodiment

Figure 2:
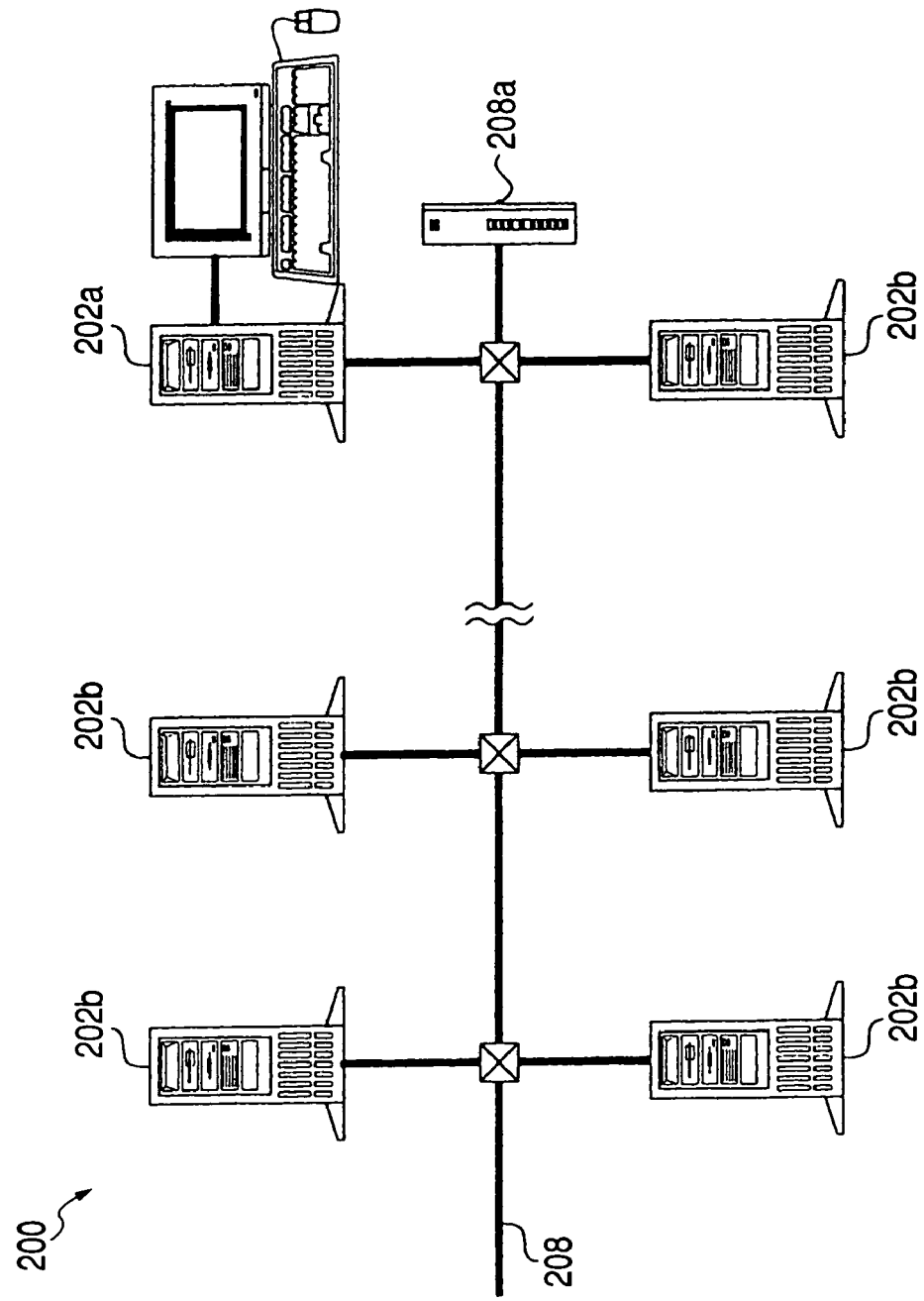
FIG. 2 is a block diagram to show a first exemplary embodiment of a particle behavior analysis system.

FIG. 2 is a block diagram to show a first exemplary embodiment of a particle behavior analysis system of one configuration example of particle behavior analysis apparatus according to the invention. A particle behavior analysis system 200 of the first exemplary embodiment has plural particle behavior analysis apparatuses 202 each having a particle behavior analysis function, the apparatuses 202 being connected via a network 208.

The particle behavior analysis apparatuses 202 can mutually transfer main processing data through the network 208 and can execute particle behavior analysis processing in parallel and are implemented as practical cluster type parallel computers as the particle behavior analysis system 200. The network 208 is managed in the communication state by a network management apparatus 208a having a routing function.

Each particle behavior analysis apparatus 202 is implemented as a general-purpose computer. In the example shown in the figure, one of the particle behavior analysis apparatuses 202 as the components of the particle behavior analysis system 200 functions as a main particle behavior analysis apparatus 202a for controlling the whole, and the remaining particle behavior analysis apparatuses 202 are connected to the network 208 as sub particle behavior analysis apparatus 202b controlled by the main particle behavior analysis apparatus 202a.

For convenience, the figure shows a mode in which one network line is derived from the network management apparatus 208a and the main particle behavior analysis apparatus 202a and the sub particle behavior analysis apparatus 202b are connected to the network line. In fact, however, the particle behavior analysis apparatuses 202 are connected to ports of the network management apparatus 208a for communicating with each other through the network management apparatus 208a.

A command input unit 210 of a keyboard, a mouse, etc., for the user to operate the system for particle behavior analysis processing in various manners and a display 212 for presenting the processing result to the user as image information are connected to the main particle behavior analysis apparatus 202a.

Such a system configuration of the first exemplary embodiment is adopted, whereby to perform particle behavior analysis processing for a system involving plural types of multi-particle interactions, it is made possible to conduct parallel processing analysis on the interaction such as magnetic interaction, electrostatic interaction, or mechanical interaction (contract force; contact force between a wall and particles, a contact force produced by particle-to-particle contact) between particles. The mechanical interaction is a contact force between a wall or any other substance and particles or a contact force produced by particle-to-particle contact, for example.

For example, magnetic motion analysis using a magnetic field analysis method based on a Maxell equation or the like is conducted on the carrier particles 102a, pure mechanical motion analysis using a particle element method, etc., or electrostatic field analysis focusing attention on Coulomb force is conducted on the toner particles 102b, and finally the analysis results are combined for predicting the flow behavior of the developer 102 with high accuracy.

Particularly in this exemplary embodiment, when each particle behavior analysis apparatus 202 conducts analysis on each interaction, a force decomposition method (an algorithm using a force matrix) rather than a spatial decomposition method (SD), a particle decomposition method (PD), or a replicated data method (RD) is used to conduct analysis for decreasing the communication amounts among all processors (the particle behavior analysis apparatuses 202 in this exemplary embodiment). If the communication amounts are decreased, the paralleling performance of the programs when multiple processors are used can be enhanced and the calculation time can be shortened drastically (as described later in detail).

Particle Behavior Analysis System

Second Exemplary Embodiment

Figure 3:
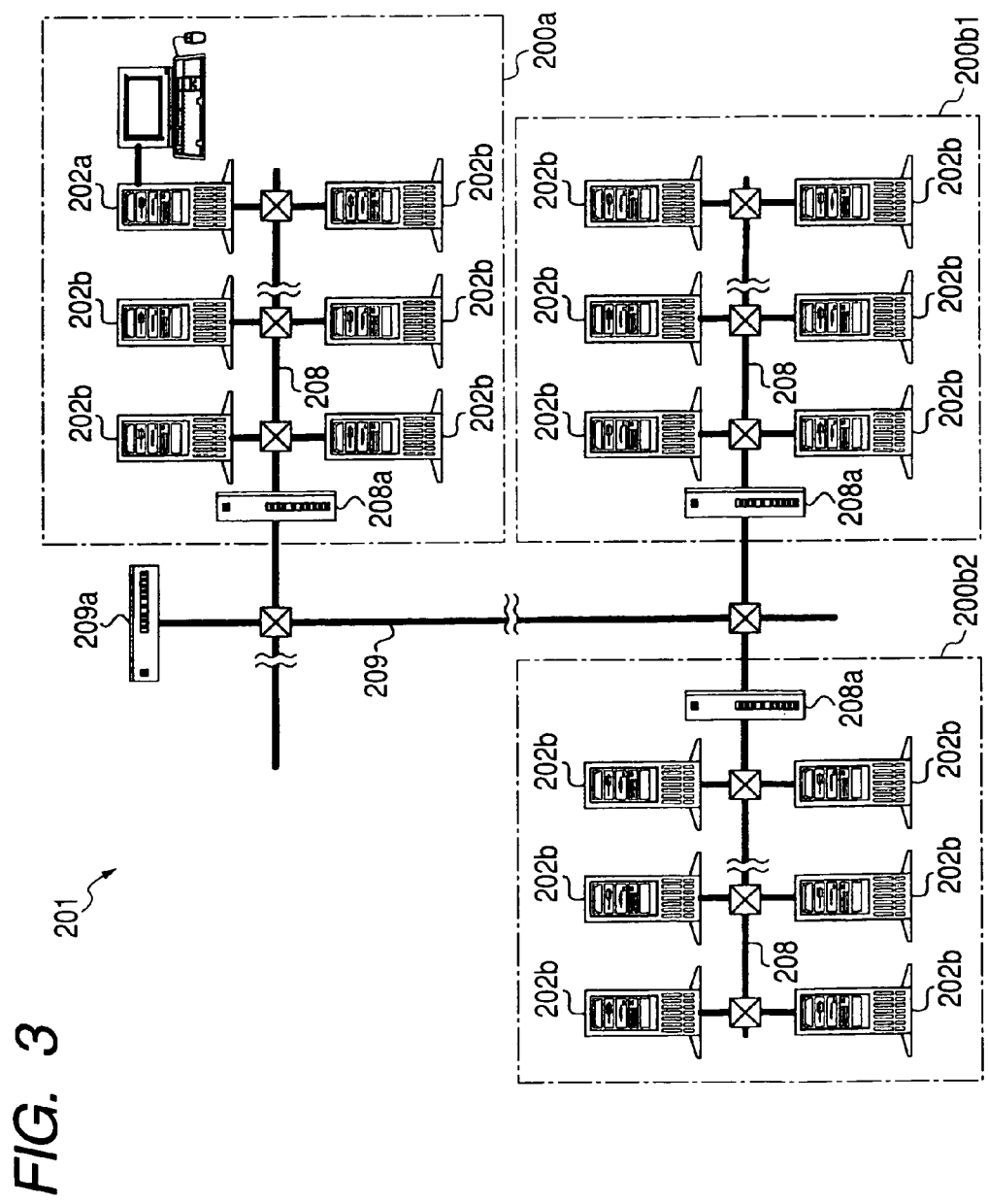
FIG. 3 is a block diagram to show a second exemplary embodiment of a particle behavior analysis system.

FIG. 3 is a block diagram to show a second exemplary embodiment of a particle behavior analysis system of one configuration example of particle behavior analysis apparatus according to the invention. A particle behavior analysis system 201 of the second exemplary embodiment is characterized in that plural particle behavior analysis systems 200 each having plural particle behavior analysis apparatuses 202 each having a particle behavior analysis function, the apparatuses 202 being connected via a network 208 (in the configuration example, particularly first network) as parallel computers are further connected by another network 209.

In this exemplary embodiment, the network 208 is particularly called first network 208 and the network 209 is called second network 209. The second network 209 is managed in the communication state by a network management apparatus 209a having a routing function.

For convenience, the figure shows a mode in which one network line is derived from the network management apparatus 209a and a main particle behavior analysis system 200a and sub particle behavior analysis systems 200b (in particular, network management apparatus 208a) are connected to the network line. In fact, however, the network management apparatus 208a of the particle behavior analysis systems 200 are connected to ports of the network management apparatus 209a for the particle behavior analysis systems 200 to communicate with each other through the network management apparatus 209a.

In this exemplary embodiment, the communication specifications of the first network 208 and the second network 209 are not an issue. For example, they may adopt the same communication protocol or may differ in communication protocol. The networks may adopt the same communication speed or may differ in communication speed.

The particle behavior analysis systems 200 can mutually transfer main processing data through the external network (in the configuration example, particularly the second network 209) and can execute particle behavior analysis processing different in target in parallel and are implemented as grid computers as practical parallel computers are connected by the network as the particle behavior analysis system 201.

In the example shown in the figure, one of the particle behavior analysis systems 200 (one parallel computer system) as the components of the particle behavior analysis system 201 functions as a main particle behavior analysis system 200a for controlling the whole, and the remaining particle behavior analysis systems 200 are connected via the second network 209 as sub particle behavior analysis systems 200b1 and 200b2 controlled by the main particle behavior analysis system 200a.

The main particle behavior analysis system 200a includes the main particle behavior analysis apparatus 202a including the command input unit 210 and the display 212 in the configuration of the first exemplary embodiment. On the other hand, each sub particle behavior analysis system 200b is made up of sub particle behavior analysis apparatus 202b and network management apparatus 208a.

For example, each particle behavior analysis system 200 can conduct analysis processing specialized for any interaction such as magnetic interaction, electrostatic interaction, or mechanical interaction (contract force) and can execute analysis processing on the discrete interaction in parallel. This means that plural types of interactions can be analyzed independently and simultaneously using different particle behavior analysis systems 200.

Alternatively, analysis processing on the interaction such as magnetic interaction, electrostatic interaction, or mechanical interaction (contract force) can be executed in parallel separately for the carrier particles 102a and the toner particles 102b making up the developer 102. Particle behavior analysis processing can be performed using different particle behavior analysis systems 200 for each particle type, for example, in such a manner that particle behavior analysis processing specialized for magnetic force and electrostatic force is performed on the toner particles 102b with the large effect degree of both magnetic force and electrostatic force while particle behavior analysis processing specialized for magnetic force is performed on the carrier particles 102a with the large effect degree of magnetic force.

Each particle behavior analysis system 200 conducts analysis on each interaction using the force decomposition method rather than the particle decomposition method or the replicated data method as previously described in the first exemplary embodiment. The force decomposition paralleling method with small communication amount is adopted in communications between the particle behavior analysis systems 200 implemented as parallel computer systems, so that the large advantage of the communication speed is provided.

That is, such a system configuration of the second exemplary embodiment is adopted, whereby the particle behavior analysis systems 200 can perform independent particle behavior analysis processing, so that the processing time can be shortened more than that in the system configuration of the first exemplary embodiment.

The particle behavior analysis system 200 (practical parallel computer system) to be used can also be selected based on the processing capability in response to the degree of the calculation load of the interaction between particles. Accordingly, the particle behavior analysis processing can also be performed efficiently using the computer resources in a situation in which systems different in environment (performance, etc.,) are mixed.

<Particle Behavior Analysis Apparatus; Function Blocks>

Figure 4:
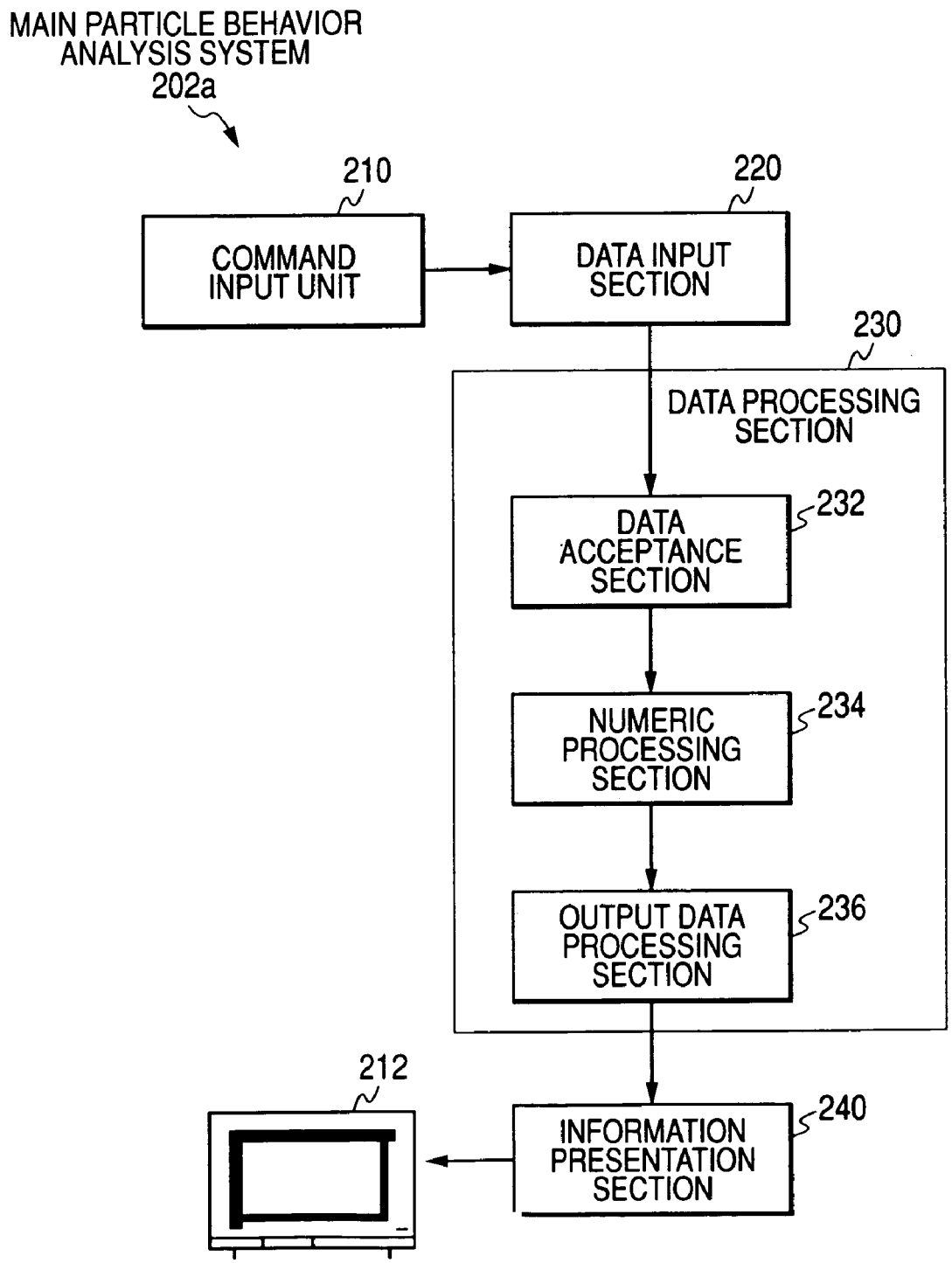
FIG. 4 is a block diagram to show one configuration example of a particle behavior analysis apparatus.

FIG. 4 is a block diagram to show one configuration example of each particle behavior analysis apparatus 202; here, it shows particularly one configuration example of the main particle behavior analysis apparatus 202a. As shown in the figure, the main particle behavior analysis apparatus 202a includes a data input section 220 for inputting the data to be processed using a command input unit 210, etc., a data processing section 230 for performing particle behavior analysis processing, and an information presentation section 240 for presenting the processing result to the user using a display 212, etc.

The data input section 220 accepts a command and data entered by the user through a keyboard and a mouse making up the command input unit 210 and passes the command and the data to the data processing section 230.

The data processing section 230 performs particle behavior analysis processing (described later) based on the data input from the data input section 220. More particularly, the data processing section 230 has a data acceptance section 232, a numeric processing section 234, and an output data processing section 236.

The data acceptance section 232 includes a data storage section (not shown) and stores the data input from the data input section 220 in the data storage section and supplies the required data at the numeric calculation time to the numeric processing section 234. For example, the data concerning the configuration of the developing unit 100 to be analyzed and the property values of the developer 102 and the like are stored in the data storage section of the data acceptance section 232.

The numeric processing section 234 analyzes the particle behavior considering plural interactions such as magnetic interaction, electrostatic interaction, or mechanical interaction (contract force) at the same time about the developer 102 as an example of particles (more particularly, the carrier particles 102a and the toner particles 102b) based on the data supplied from the data acceptance section 232 by performing simulation processing applying the force decomposition method. The numeric processing section 234 supplies the analysis result to the output data processing section 236.

The output data processing section 236 receives the calculation result of the numeric processing section 234, converts the received calculation result into display data, and supplies the display data to the display 212. The display 212 displays a processing result image based on the display data supplied from the output data processing section 236. The behavior prediction of the developer 102 is visualized and is displayed on the display 212, whereby the behavior of the developer 102 difficult to check actually can be grasped visually.

<Particle Behavior Analysis Apparatus; Computer Configuration>

Figure 5:
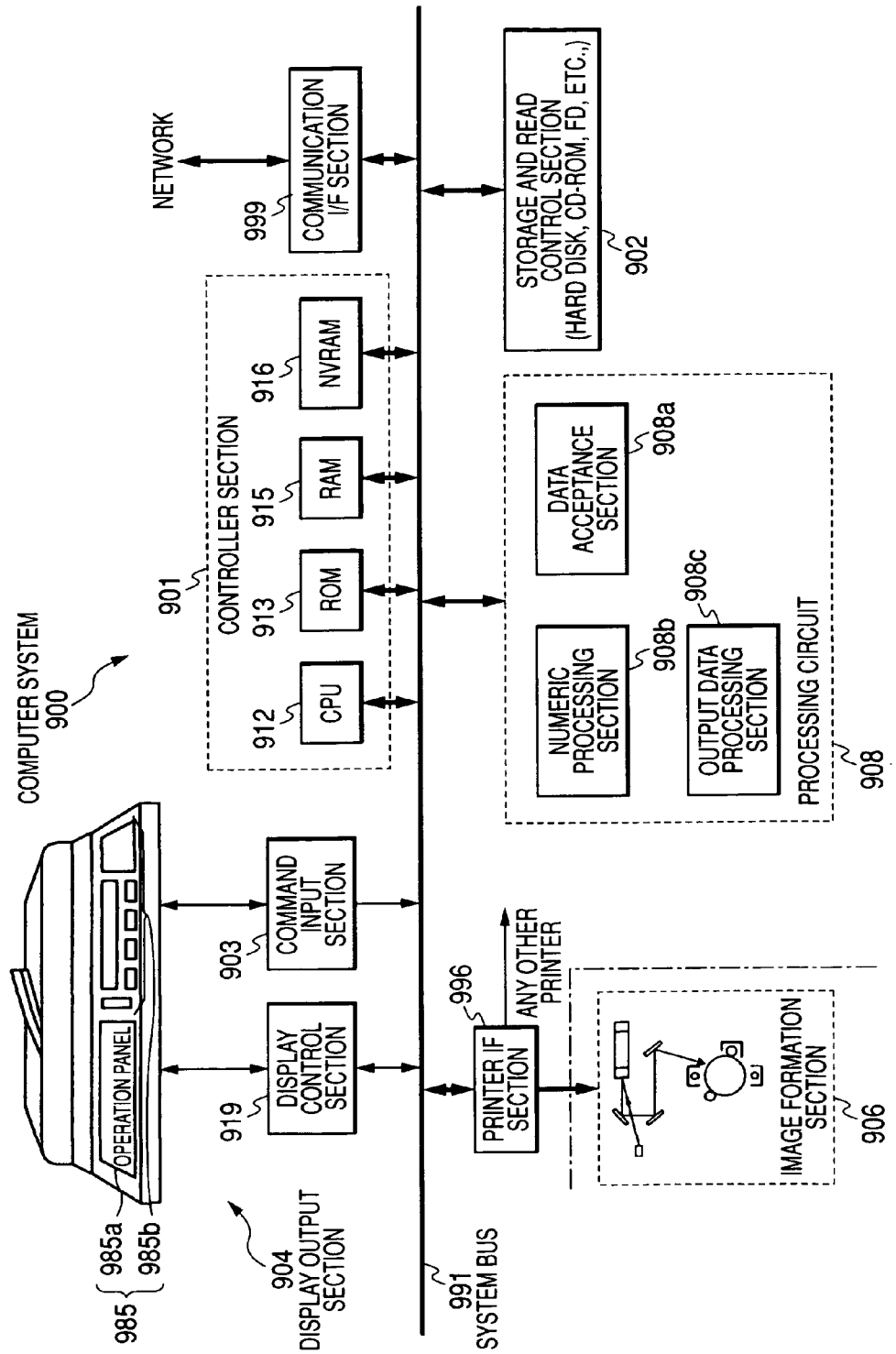
FIG. 5 is a diagram to show one hardware configuration example for implementing a particle behavior analysis apparatus using a computer.

FIG. 5 is a block diagram to show another configuration example of each particle behavior analysis apparatus 202. Here, it shows the realistic hardware configuration of the particle behavior analysis apparatus constructed by a microprocessor, etc., for executing software of particle behavior analysis using a computer such as a personal computer.

That is, in this exemplary embodiment, the mechanism for analyzing the particle behavior considering two or more types of interaction forces and using the force decomposition paralleling algorithm using a force matrix can be configured not only by a hardware processing circuit, but also by software using a computer based on the program code for providing the function.

Therefore, a program preferred for realizing the mechanism according to the invention by software using a computer or a computer-readable storage medium storing the program can also be extracted as the invention. The mechanism for executing particle behavior analysis processing by software is adopted, whereby the advantage of making it possible to easily change the processing procedure, etc., without involving change in the hardware can be provided.

To cause a computer to execute the particle behavior analysis processing function considering two or more types of interaction forces using the force decomposition paralleling algorithm by software, the program of the software is installed from a storage medium in a computer built in dedicated hardware (built-in microcomputer, etc.,), an SOC (System On a Chip) for implementing any desired system by installing the functions of a logic circuit, a storage unit, etc., on one chip, a general purpose computer that can execute various functions as various programs are installed, or the like.

The storage medium can cause state change of energy of magnetism, light, electricity, etc., to occur in a reader included in the hardware resources of a computer in response to the program descriptions and can transfer the program descriptions to the reader in the form of a signal corresponding to the state change.

For example, the storage medium may be implemented not only as a package medium (portable storage medium) of a magnetic disk (containing a flexible disk), an optical disk (containing CD-ROM (Compact Disk-Read-Only Memory) and DVD (Digital Versatile Disk)), a magneto-optical disk (containing MD (Mini Disk), semiconductor memory, or the like where the program is stored, distributed for providing the user with the program, but also as ROM, a hard disk, etc., where the program is stored, provided for the user in a state in which it is previously built in a computer.

The program of the software may be provided not only through a storage medium, but also a wire or wireless communication network, etc.

For example, a similar advantage to that when the particle behavior analysis processing function is provided by a hardware processing circuit can also be accomplished by supplying a storage medium storing the program code of the software for providing the particle behavior analysis processing function using the force decomposition paralleling method and considering plural types of interaction forces to a system or an apparatus and reading and executing the program code stored in the storage medium by a computer (or a CPU or an MPU) of the system or the apparatus. In this case, the program code read from the storage medium implements the particle behavior analysis processing function using the force decomposition paralleling method and considering plural types of interaction forces.

As the program code read by the computer is executed, the particle behavior analysis processing function using the force decomposition paralleling method and considering plural types of interaction forces is implemented and in addition, the OS (Operating System) running in a computer or the like may perform a part or all of actual processing and the particle behavior analysis processing function using the force decomposition paralleling method and considering plural types of interaction forces may be implemented according to the processing.

Further, after the program code read from the storage medium is written into memory included in a function expansion card inserted into the computer or a function expansion unit connected to the computer, a CPU, etc., included in the function expansion card or the function expansion unit may perform a part or all of actual processing and the particle behavior analysis processing function may be implemented according to the processing.

The program is provided as a file describing the program code for implementing the particle behavior analysis processing function using the force decomposition paralleling method and considering plural types of interaction forces. In this case, the program may be provided not only as a batch program file, but also as separate program modules in response to the hardware configuration of the system implemented as computer.

For example, a computer system 900 has a controller section 901 and a storage and read control section 902 for storing and reading data in and from a predetermined storage medium of a hard disk, a flexible disk (FD) drive, a CD-ROM (Compact Disk ROM) drive, a semiconductor memory controller, etc.

The controller section 901 has a CPU (Central Processing Unit) 912, ROM (Read-Only Memory) 913 of a read-only storage section, RAM (Random Access Memory) 915 which allows write and read at any time and is as an example of a volatile storage section, and RAM (NVRAM) 916 as an example of a nonvolatile storage section.

The expression "volatile storage section" is used to mean a storage section in a mode in which the storage contents are lost if the power of the apparatus is turned off. On the other hand, the expression "nonvolatile storage section" is used to mean a storage section in a mode in which the storage contents are retained if the main power of the apparatus is turned off. The nonvolatile storage section may be any if it can continue to retain the storage contents; the nonvolatile storage section may be not only a semiconductor memory device having nonvolatile, but also a volatile memory device designed for presenting "nonvolatile" as it is provided with a backup power source.

The nonvolatile storage section may be implemented not only as a semiconductor memory device, but also using a medium such as a magnetic disk or an optical disk. For example, a hard disk can be used as the nonvolatile storage section. A configuration for reading information from a storage medium such as a CD-ROM can also be used as the nonvolatile storage section.

The computer system 900 also has a command input section 903 as a function section serving as a user interface, a display output section 904 for presenting predetermined information of a guidance screen at the operation time, the processing result, etc., to the user, and an interface section (IF section) 909 for providing an interface function with the function sections.

An image formation section 906 for outputting the processing result to a predetermined output medium (for example, print paper) can also be provided for printing out the analysis processing result and presenting the processing result to the user.

For example, an operation key section 985*b* of a user interface section 985 can be used as the command input section 903 or a keyboard, a mouse, etc., can also be used.

The display output section 904 includes a display control section 942 and a display. For example, an operation panel section 985*a* of the user interface section 985 can be used as the display. Alternatively, any other display section of a CRT (Cathode Ray Tube), an LCD (Liquid Crystal Display), etc., can also be used.

For example, the display control section 942 displays guidance information, the whole image input by an image read section 905, etc., on the operation panel section 985*a* or display section. It can also be used as a display for providing the user with various pieces of information. Display section having a touch panel on a display screen can also be adopted for implementing the command input section 903 for allowing the user to enter predetermined information with his or her finger, a pen, etc.

The interface section 909 includes a printer IF section 996 for providing an interface section with the image formation section 906 and any other printer, for example, as well as a system bus 991 of a transfer path of process data (containing image data) and control data and a communication IF section 999 as an interface for transferring communication data to and from a network.

In the described configuration, the CPU controls the whole system through the system bus 991. The ROM 913 stores a control program of the CPU 912, etc. The RAM 915 is implemented as SRAM (Static Random Access Memory), etc., for storing program control variables, data for various types of processing, etc. The RAM 915 contains a temporary storage area of data provided by performing operations in accordance with a predetermined application program, externally acquired data, etc.

For example, the program for causing the computer to execute the particle behavior analysis processing function using the force decomposition paralleling method and considering plural types of interaction forces is distributed through a storage medium such as a CD-ROM. Alternatively, the program may be stored on an FD rather than a CD-ROM. An MO drive may be provided for storing the program on an MO disk or the program may be stored on any other storage medium such as a nonvolatile semiconductor memory card of flash memory, etc. Further, the program may be downloaded from any other server via a network such as the Internet and may be acquired or updated.

In addition to an FD, a CD-ROM, etc., an optical storage medium such as a DVD, a magnetic storage medium such as an MD, a magneto-optical storage medium such as a PD, a tape medium, and semiconductor memory of an IC card, a miniature card, etc., can be used as the storage medium for providing the program. Some or all functions for implementing the particle behavior analysis processing function using the force decomposition paralleling method and considering plural types of interaction forces can be stored on an FD, a CD-ROM, etc., as an example of the storage medium.

The hard disk contains a temporary storage area of large amounts of data for various types of processing performed by the control program, the data acquired in the apparatus, the externally acquired data, etc.

According to the described configuration, particle behavior analysis method execution program (particle behavior analysis program) described later is installed in the RAM 915 from the readable storage medium such as a CD-ROM where the particle behavior analysis program is stored according to a command entered by the operator through the operation key section 985*b* and the particle behavior analysis program is started according to a command entered by the operator through the operation key section 985*b* or automatic processing.

The CPU 912 performs calculation processing involved in a particle behavior analysis method (described later) in accordance with the particle behavior analysis program, stores the processing result in the RAM 915 or the storage unit of hard disk, etc., and outputs the processing result to the operation panel section 985*a* or the display of CRT, LCD, etc., as required. The storage medium storing the particle behavior analysis method execution program can be used to construct the particle behavior analysis system in a general-purpose manner without changing the already existing system.

In addition to the configuration using the computer, dedicated hardware devices for performing processing of the function sections previously described with reference to FIG. 4 can also be combined to implement the particle behavior analysis systems 200 or the particle behavior analysis apparatuses 202 for performing the particle behavior analysis processing using the force decomposition paralleling method and considering plural types of interaction forces.

For example, instead of performing all processing of the functional portions for the particle behavior analysis processing using the force decomposition paralleling method and considering plural types of interaction forces by software, a processing circuit 908 for performing some of the functional portions as dedicated hardware may be provided. Although the mechanism using software can flexibly deal with parallel processing and successive processing, as the processing becomes complicated, the processing time is prolonged and thus a decrease in the processing speed introduces a problem.

In contrast, the hardware processing circuit performs processing, so that it is made possible to construct an accelerator system intended for speeding up. Even if processing is complicated, the accelerator system can prevent a decrease in the processing speed and high throughput can be provided.

For example, to implement the particle behavior analysis processing function using the force decomposition paralleling method and considering plural types of interaction forces, as the processing circuit 908, a data acceptance section 908a corresponding to the data acceptance section 232 forming a part of the data processing section 230 shown in FIG. 4, a numeric processing section 908b corresponding to the numeric processing section 234 forming a part of the data processing section 230, an output data processing section 908c corresponding to the output data processing section 236 forming a part of the data processing section 230, and the like may be implemented as hardware.

<Force Decomposition Parallel Processing; Basic>

FIGS. 6 to 14 are drawings to describe paralleling processing of the force decomposition method (algorithm using a force matrix) applied in the particle behavior analysis processing of this exemplary embodiment. FIG. 6 is a flowchart to show an example of a force decomposition parallel processing procedure.

FIG. 7 is a drawing to describe a technique of assigning the particles to be analyzed to nodes. FIGS. 8 to 10 are drawings to describe the interaction calculation targets in each node about the magnetic interaction, the electrostatic interaction, and the mechanical interaction (contact force).

Figure 13A:
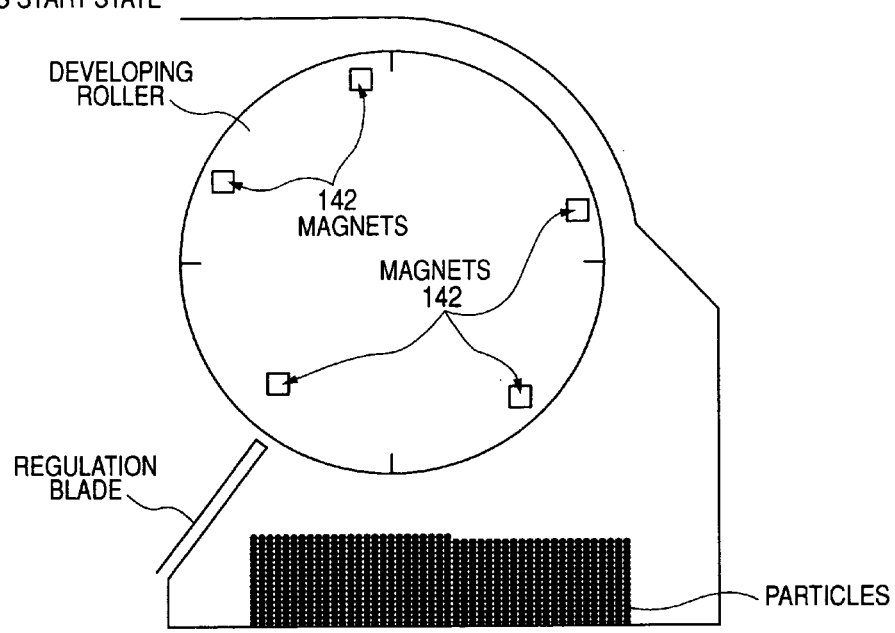
FIGS. 13A and 13B are drawings showing the state of a developer at the initial and last stages of analysis processing.
Figure 13B:
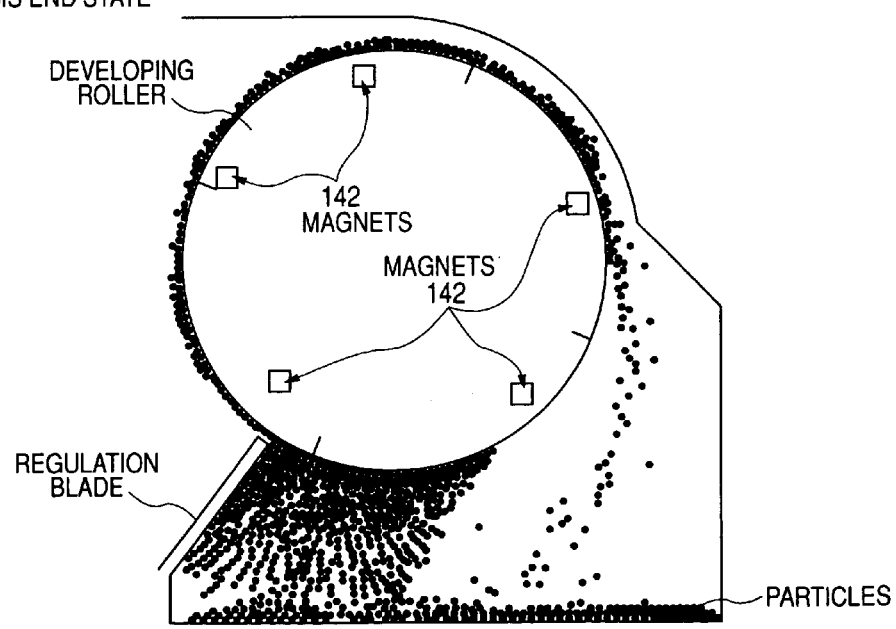

FIG. 11 is a drawing to describe addition processing of the interaction forces found in the nodes (particularly, in the row direction of the force matrix). FIG. 12 is a drawing to describe other specific processors which need to communicate the interaction forces calculated in the row direction and the column direction. FIG. 13 is a drawing to show the state of the developer 102 at the initial and last stages of analysis processing. FIG. 14 is a drawing to summarize the processors to communicate when the force matrix in the force decomposition method is used with attention focused on node #6. In the force matrix, it is assumed that all particles are the carrier particles 102a, and the force matrix for the interaction of the magnetic force is shown.

In this exemplary embodiment, when each particle behavior analysis apparatus 202 conducts analysis on each interaction, the force decomposition method (algorithm using a force matrix) rather than the spatial decomposition method, the particle decomposition method, or the replicated data method is used to conduct analysis for decreasing the communication amounts among all processors. If the communication amounts are decreased, the paralleling performance of the programs when multiple processors are used can be enhanced and the calculation time can be shortened drastically.

To begin with, the number of the particle behavior analysis apparatuses 202 making up the particle behavior analysis system 200 or the number of the particle behavior analysis systems 200 making up the particle behavior analysis system 201 that can be used for particle behavior analysis processing at present (the number of processors) is determined (S102). Then, calculation conditions of various physical parameters required for calculation, the initial placement of particles, the number of particles to be analyzed required particularly in the force decomposition method, etc., are read (S104). For example, to analyze the developer 102 in the developing unit 100, it is assumed that the initial placement of the developer 102 is in a state shown in FIG. 13 (A).

The processors determined at step S102 are placed as a matrix as shown in FIG. 7 and the particles to be analyzed (the carrier particles 102a and the toner particles 102b making up the developer 102) are assigned (S106). Each numbered processor (particle behavior analysis apparatus 202 or particle behavior analysis system 200) is also called node #N (in the example, 0 to 15).

In the example shown in FIG. 7, a force matrix to perform parallel calculation on 32 particles by the 16 processors is shown. In the longitudinal direction, home node #N (processor numbers) and attention particles are shown and in the lateral direction, communicating node #N (processor numbers) and attention particles are shown.

Since parallel calculation is performed on 32 particles by the 16 processors, each of the processors placed in the force matrix with four rows and four columns first focuses attention on two particles and analyzes the interaction between each attention particle and another particle. For example, focusing attention on node #6, the 12th and 13th particles are adopted as the attention particles.

Next, plural types of multiparticle interaction forces are distributed among the processors existing in the row direction and the column direction with the home processor in the force matrix as the center (particularly, called specific processors) and requiring communications for calculation (S110). At this time, although described later in detail, different force matrixes are used for the plural types of multiparticle interactions for calculation.

For example, magnetic interaction is analyzed using a force matrix to analyze magnetic interaction shown in FIG. 8. Electrostatic interaction is analyzed using a force matrix to analyze electrostatic interaction shown in FIG. 9. Contract force is analyzed using a force matrix to analyze mechanical interaction (contract force) shown in FIG. 10.

The force matrixes each for each of the interactions shown in FIGS. 8 to 10 are characterized in that they differ in handled particle numbers. The different force matrixes are used for calculation for each type of multiparticle interactions, so that only the particles as many as the minimum number of particles required for the interaction calculation may be calculated in each matrix and the calculation time can be shorted as compared with the case where all particles are calculated. Adjustment can also be made in the direction of increasing the number of particles to be analyzed that each processor takes charge of in expectation of the shortened time, namely, decrease in the calculation load.

For example, it is assumed that particle numbers 0 to 15 of the 32 particles to be analyzed are carrier particles 102a (with "C" added to the right of each particle number in FIGS. 8 to 10) and that particle numbers 16 to 31 are toner particles 102b (with "T" added to the right of each particle number in FIGS. 8 to 10). It is also assumed that the interactions requiring analysis about the carrier particles 102a are magnetic force and contact force and that the interactions requiring analysis about the toner particles 102b are electrostatic force and contact force.

In this case, the force matrix of the magnetic force is shown in FIG. 8 containing only the carrier particles 102a, the force matrix of the electrostatic force is shown in FIG. 9 containing only the toner particles 102b, and the force matrix of the contact force is shown in FIG. 10 containing the carrier particles 102a and the toner particles 102b. The number of particles that each processor takes charge of is set to "2" in the force matrix for the contact force (FIG. 10); it is set to "4" rather than "2" in the force matrix for the magnetic interaction (FIG. 8) and the force matrix for the electrostatic interaction (FIG. 9).

Thus, the different force matrixes are used, whereby only the particles as many as the necessary minimum number may be calculated in each force matrix and the calculation time can be shorted depending on the force matrix. For example, calculation is performed only on the 16 carrier particles 102a in the force matrix of the magnetic force, so that the total calculation time can be shorted as compared with the case where all 32 particles are calculated.

For example, as seen in FIG. 7 (or FIG. 10), the force decomposition method is characterized in how to combine mated particles. For example, focusing attention on node #6, the interaction between the particle number 12 and 4, 5, 13, 20, 21, 28, 29 is analyzed and the interaction between the particle number 13 and 4, 5, 12, 20, 21, 28, 29 is analyzed.

For each particle, the sum total of forces acting on the particle from other particles is calculated. Thus, as for the particle numbers 12 and 13, the 12th particle requires the 13th interaction force and the 13th particle requires the 12th interaction force. However, since the magnitude of the interaction force between 12 and 13 and that between 13 and 12 are the same, one calculation may be performed.

Next, communications are conducted between the specific processors and for each interaction such as the magnetic interaction, the electrostatic interaction, or the mechanical interaction (contact force), the interactions in the row direction in the force matrix are added together. This means that the sum total SUM_Total of all interaction forces calculated in a distributed manner is found (S112). The sum total SUM_Total collectively represents plural interactions of the electrostatic force, the magnetic force, the mechanical contact force, the adhesion force, etc.

For example, as shown in FIG. 11, focusing attention on node #6, the interaction values in nodes #4, #5, and #7 are sent to node #6 and sum total calculation is performed in node #6. Accordingly, the sum total of the interaction forces of the particles 12 and 13 that node #6 takes charge of is found.

Next, using the sum total SUM_Total collectively representing plural interactions, the equation of motion of each particle is solved and the position coordinates are calculated (S114). The position coordinates of each particle thus found are sent to the specific processor relating to the interaction matrix and calculation information is updated (S116). Communications among all specific processors (nodes) are not required, so that the communication amount can be lessened.

For example, as shown in FIG. 12, focusing attention on node #6, the position coordinates of the particles 12 and 13 that node #6 takes charge of, updated by calculation from the sum total of the interaction forces are sent to nodes #4, #5, and #7 in the row direction and nodes #2, #10, and #14 in the column direction relating to the interaction matrix, because only nodes #4, #5, and #7 in the row direction and nodes #2, #10, and #14 in the column direction require particle information of the particles 12 and 13 that node #6 takes charge of. Thus, node #6 conducts communications only with the six nodes, so that the communication amount is lessened.

After this, the process returns to step S110 and similar processing is repeated until a predetermined calculation step is reached (S118). The expression "predetermined calculation step" may be a step at which all particles to be analyzed are placed in a state in which they are roughly at stable positions (all particles have flowed). For example, to analyze the developer 102 in the developing unit 100, the developer 102 may be analyzed until all developer 102 to be analyzed arrives at the last placement shown in FIG. 13 (B) from the initial placement shown in FIG. 13 (A).

Thus, in this exemplary embodiment, the processors (particle behavior analysis apparatuses 202, particle behavior analysis systems 200) each including the CPU as a processing unit, the RAM as a storage unit (memory), etc., are connected via the network 208, 209 for enabling communications with each other for forming a parallel computer system or a grid computer system, and behavior analysis is conducted considering plural interactions such as the magnetic interaction, the electrostatic interaction, or the mechanical interaction (contact force) at the same time using the force decomposition paralleling algorithm in accordance with the force matrixes as shown in FIGS. 7 to 12.

Accordingly, the force matrix shown in FIG. 14 (particle interaction rule) can be used to perform behavior analysis processing about the particles involving plural types of multiparticle interactions as in particle behavior simulation of the electrophotographic developing process such as the magnetic force, the electrostatic force, and the mechanical contact in the developer 102 (more particularly, the carrier particles 102a and the toner particles 102b) housed in the developing unit 100 of the image formation apparatus 1. Not only the behavior of one type of particle, but also the interaction of a dual-component developer made up of carrier particles 102a and toner particles 102b can be analyzed.

For example, the electromagnetic effect and the sliding friction effect from the carrier particles 102a after the toner particles 102b are electrically deposited on the photoconductor 130 and in what amount the toner particles 102b contributing to developing are jetted to the photoconductor 130 from among the carrier particles 102a can be analyzed and further the effect of the contact force acting on the toner particles 102b and the carrier particles 102a can also be analyzed.

High-speed parallel processing algorithm considering the electrostatic force, the magnetic force, the mechanical contract force, the adhesion force, or the like at the same time required for application to developer particle simulation in electrophotography can be realized.

Each of the specific processors needs to communicate only with other specific processors in the row direction and the column direction with the processor as the center relating to the interaction matrix, the communication amount can be lessened as the number of the used specific processors is increased, and the analysis processing time can be decreased reliably.

<Comparison with any Other Paralleling Processing>

FIGS. 15 to 18 are drawings to describe the processing time difference between the paralleling processing of this exemplary embodiment and any other paralleling processing. FIG.

Figure 17A:
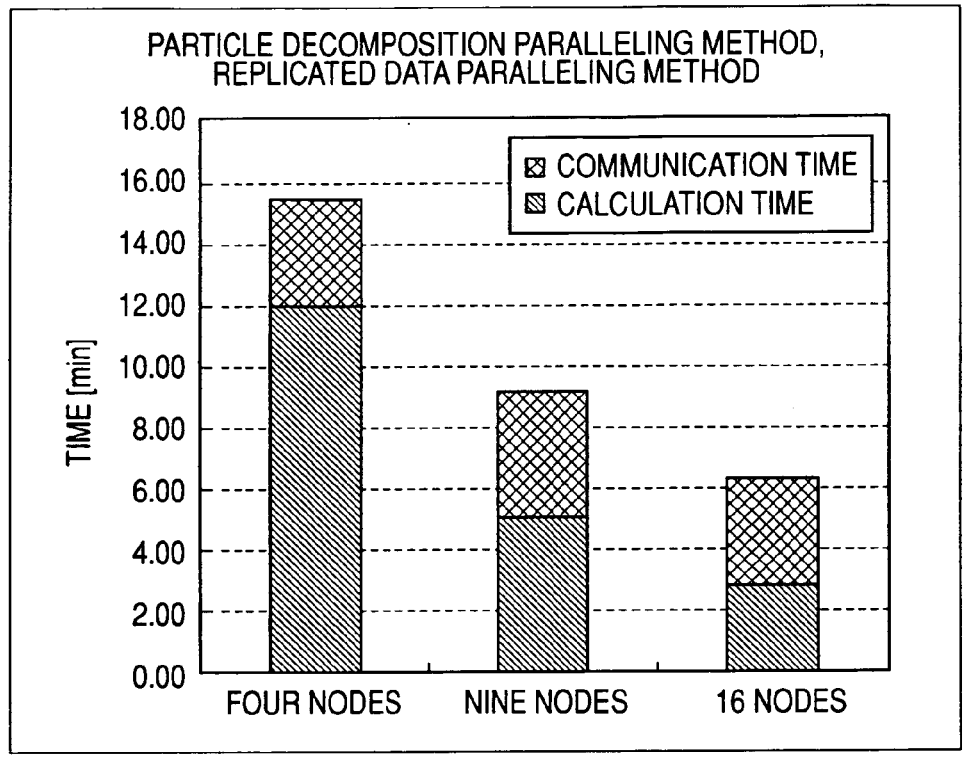
FIGS. 17A and 17B are drawings to describe the relationship between the computation time and the communication time and the number of nodes in particle decomposition paralleling processing, replicated data paralleling processing and that in force decomposition paralleling processing.
Figure 17B:
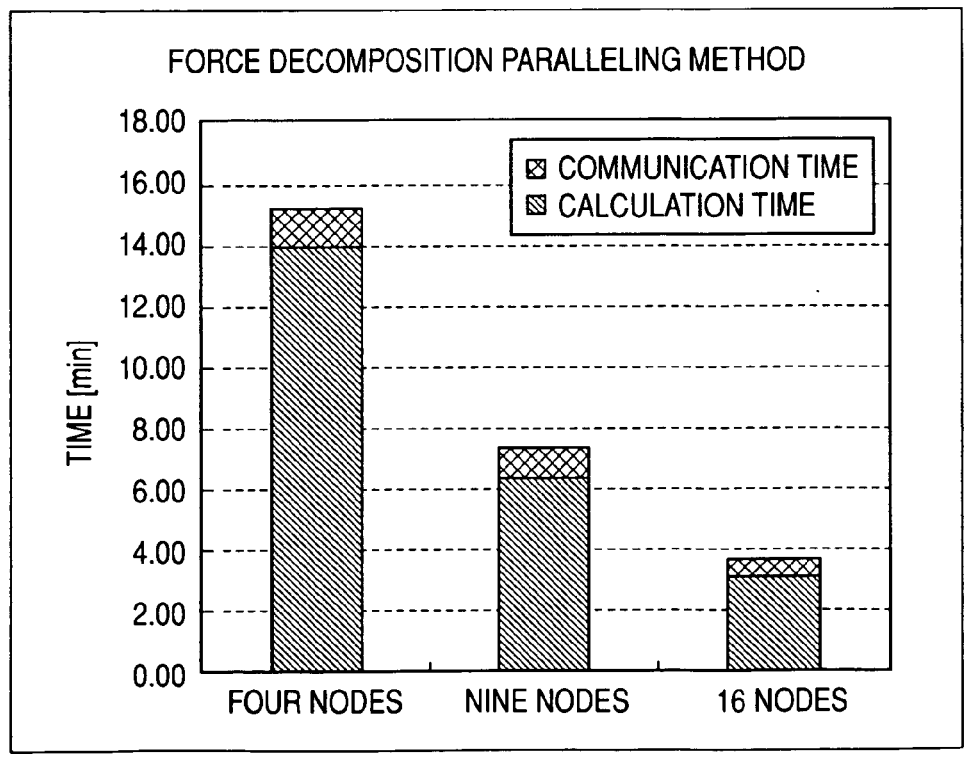
Figure 18:
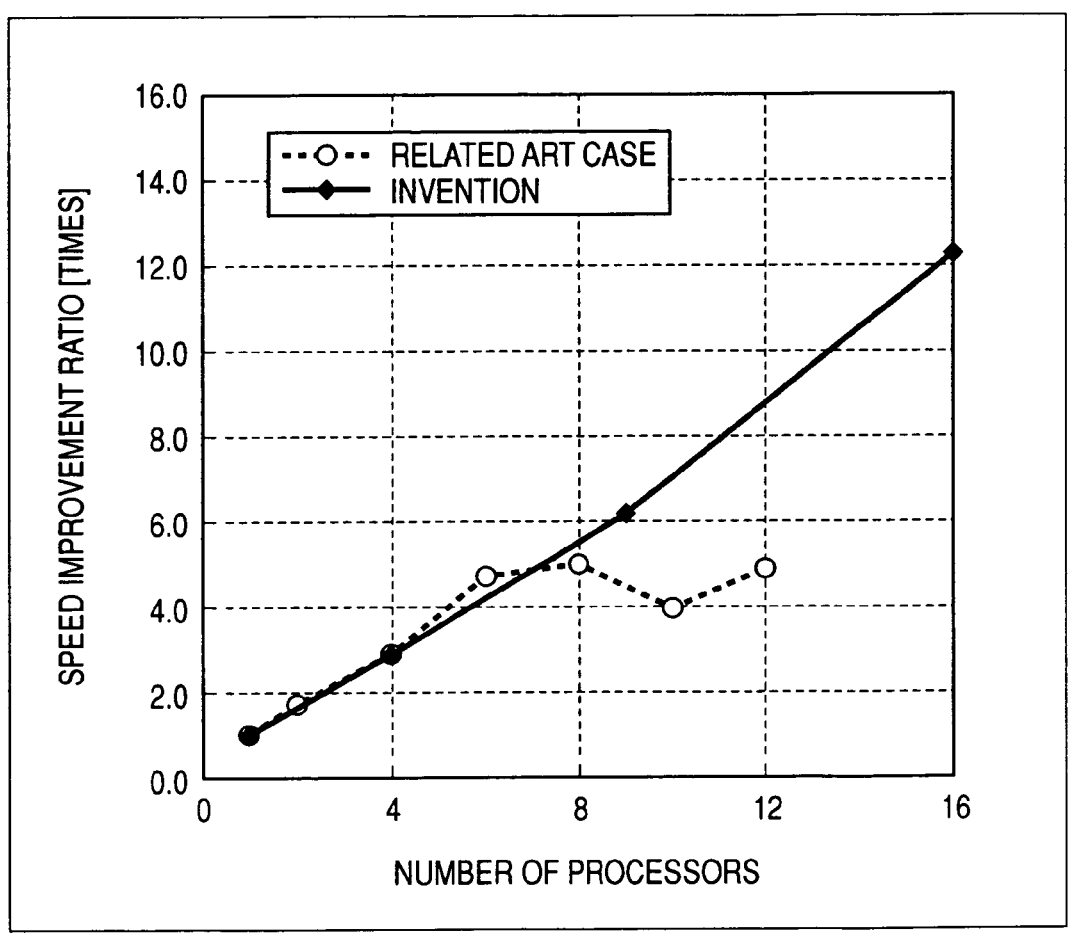
FIG. 18 is a comparison drawing to show the speed improvement ratio in force decomposition paralleling processing according to the relationship with spatial decomposition paralleling processing.

15 is a drawing to describe the speed improvement ratio in spatial decomposition paralleling processing described in the related art. FIG. 16 is a drawing to describe the nodes (processors) to communicate in the particle decomposition method, the replicated data method. FIG. 17 is a drawing to describe the relationship between the computation time (calculation time) and the communication time and the number of nodes in particle decomposition paralleling processing, replicated data paralleling processing and that in force decomposition paralleling processing. FIG. 18 is a comparison drawing to show the speed improvement ratio in force decomposition paralleling processing of this exemplary embodiment according to the relationship with spatial decomposition paralleling processing.

Figure 15:
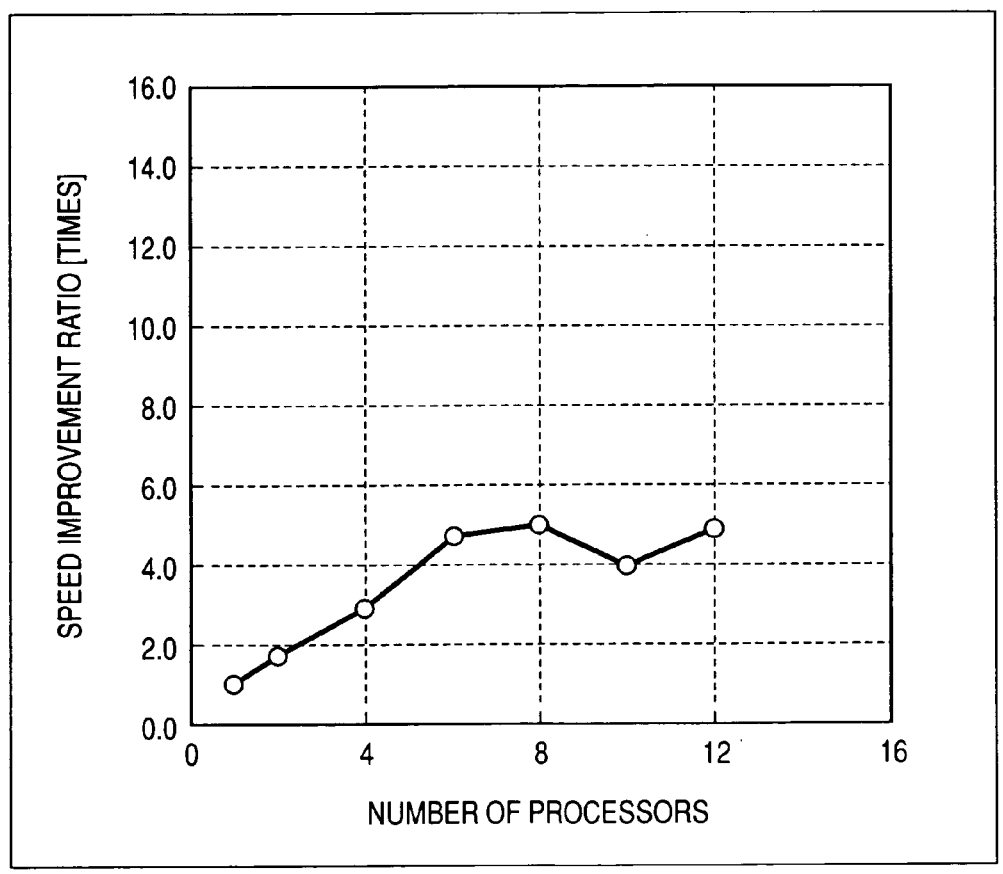
FIG. 15 is a drawing to describe the speed improvement ratio in spatial decomposition paralleling processing described in the related art.

In the spatial decomposition paralleling processing, if the number of the processors (the number of the nodes) is increased, the computation processing speed can be improved to some extent; however, if the number of the processors is increased excessively, the ratio of the communication time in all processing time grows and the effect of paralleling is saturated. For example, the saturation trend is observed in parallel calculation on the scale of about 10 processors, as shown in FIG. 15.

In the particle decomposition paralleling processing, the replicated data paralleling processing, communications among all processors become necessary and if the number of the processors is increased excessively, the ratio of the communication time in all processing time grows and the effect of paralleling is saturated. For example, the saturation trend is observed in parallel calculation on the scale of about 10 processors as with the spatial decomposition paralleling processing. For example, if the particle decomposition method, the replicated data method is adopted to execute parallel calculation of 32 particles by the 16 particle behavior analysis apparatus, the processor in node #6 needs to communicate with all other processors, as shown in FIG. 16. Thus, the time required for the communication processing does not decrease although the calculation time can be shortened as the number of the nodes used for paralleling processing, namely, the number of computers making up the parallel computer system grows.

Thus, the processor-to-processor communication time occupies most of all processing time as with the spatial decomposition paralleling method described in the related art. If the number of used specific processors becomes too large, the communication amount may increase in some cases; the paralleling performance (shortening performance of all processing time) is low and the practical effect is not high.

In contrast, in this exemplary embodiment, the processor in node #6 needs to communicate only with the specific processors in the row direction and the column direction with the processor as the center relating to the interaction matrix as shown in FIGS. 7 to 14, and the communication time can be lessened more than the communication time in the particle decomposition paralleling method, the replicated data paralleling method and in addition, the communication amount can be lessened as the number of the used specific processors is increased, and the analysis processing time can be decreased reliably, as shown in FIG. 17 (B).

Therefore, making a comparison between the speed improvement ratio in the parallel processing of this exemplary embodiment (force decomposition paralleling processing) and that in the spatial decomposition paralleling processing (which is similar to the particle decomposition paralleling processing, the replicated data paralleling processing), in the paralleling processing of this exemplary embodiment, if the number of the nodes (namely, the number of the processors) is increased, the particle behavior analysis processing speed can be improved reliably, as shown in FIG. 18.

For example, in the spatial decomposition paralleling processing, processing with 12 processors can be speeded up only about five times that with a single processor and if the number of the processors is increased more than 12, saturation occurs. In contrast, in the force decomposition paralleling processing of this exemplary embodiment, processing with 12 processors can be speeded up about nine times that with a single processor and processing with 16 processors can be speeded up about 12 times that with a single processor and a phenomenon in which if the number of the processors is increased, saturation occurs does not occur. The paralleling performance of programs when multiple processors are used can be improved reliably and it is made possible to shorten the particle behavior analysis time drastically.

Force Decomposition Parallel Processing

Detailed Example 1

Figure 19:
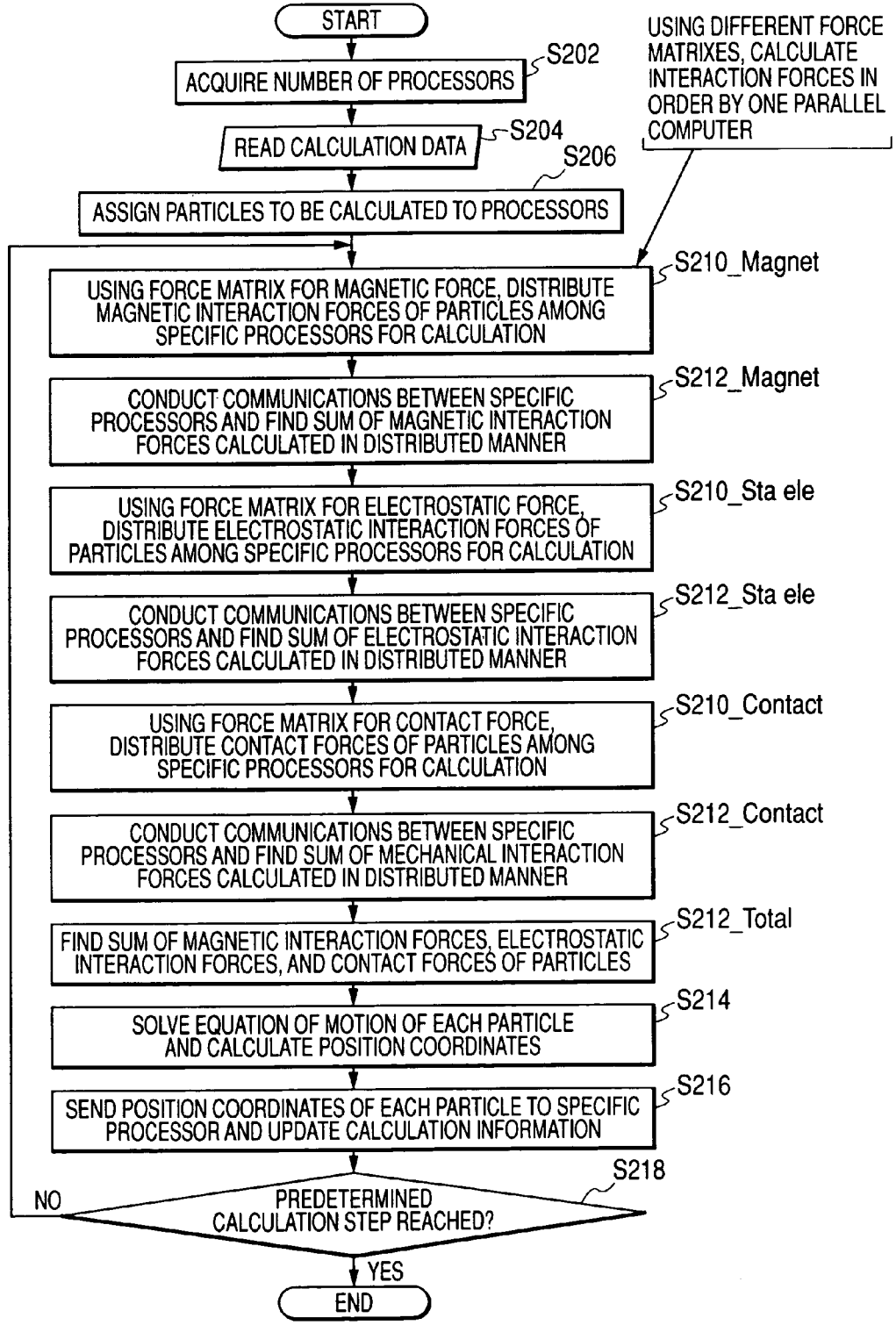
FIG. 19 is a flowchart to show a first example of force decomposition paralleling processing procedure.

FIG. 19 is a flowchart to describe paralleling processing of the force decomposition method (algorithm using a force matrix) applied in the particle behavior analysis processing of this exemplary embodiment. FIG. 19 shows a first example of the detailed force decomposition parallel processing procedure of performing analysis processing of the magnetic interaction, the electrostatic interaction, or the mechanical interaction (contact force) using a separate force matrix about the developer 102 (more particularly, the carrier particles 102a and the toner particles 102b) used in electrophotography (parallel processing example 1 in electrophotographic simulation).

The processing procedure in the first example is characterized in that the particle behavior analysis systems 200 of the first exemplary embodiment shown in FIG. 2 sequentially analyzes the magnetic interaction, the electrostatic interaction, and the mechanical interaction (contact force) using separate force matrixes about the developer 102 (more particularly, the carrier particles 102a and the toner particles 102b). This means that the processing procedure is characterized in that the same parallel computer system sequentially analyzes the interactions.

Unlike the detailed procedure in a third example describer later, the processing procedure in the first example is characterized in that particles on which each processor focuses attention are assigned regardless of whether the particles are the carrier particles 102a or the toner particles 102b making up the developer 102. Therefore, to one node processor, the carrier particles 102a and the toner particles 102b may be assigned as they are mixed, all carrier particles 102a may be assigned, or all toner particles 102b may be assigned.

Specifically, to begin with, the main particle behavior analysis apparatus 202a determines the number of the particle behavior analysis apparatuses 202 (the number of processors) making up the particle behavior analysis systems 200 that can be used for particle behavior analysis processing at present (S202). Then, calculation conditions of various physical parameters required for calculation, the initial placement of particles, the number of particles to be analyzed required particularly in the force decomposition method, etc., are read (S204). The particle behavior analysis apparatuses 202 (processors) determined at step S202 are placed as a matrix as shown in FIG. 7 and the particles to be analyzed (the carrier particles 102a and the toner particles 102b making up the developer 102) are assigned (S206).

Next, plural types of multiparticle interaction forces are distributed among the specific processors for calculation. At this time, different force matrixes are used for the plural types of multiparticle interactions for calculation. For example, analysis processing of the magnetic interaction with the mated particle in the matrix in charge is performed using the force matrix for magnetic interaction analysis (S210_Magnet). Next, the specific processors communicate with each other for finding the sum total SUM_Magnet of the magnetic interaction forces calculated in the distributed manner for the magnetic interaction (S212_Magnet).

Likewise, analysis processing of the electrostatic interaction with the mated particle in the matrix in charge is performed using the force matrix for electrostatic interaction analysis (S210_Sta ele). Next, the specific processors communicate with each other for finding the sum total SUM_Sta ele of the electrostatic interaction forces calculated in the distributed manner for the electrostatic interaction (S212_Sta ele).

Analysis processing of the mechanical interaction (contact force) with the mated particle in the matrix in charge is performed using the force matrix for mechanical interaction analysis (S210_Contact). Next, the specific processors communicate with each other for finding the sum total SUM_Contact of the mechanical interaction forces calculated in the distributed manner for the mechanical interaction (S212_Contact).

To analyze each interaction, it is not necessary to analyze all of plural types of interactions for all particles and the interactions to be analyzed can be narrowed down in response to the characteristic of the particle type, for example, in such a manner that for the carrier particles 102a having magnetism, collision force, magnetic moment, and magnetic force are analyzed without considering the electrostatic force and for the non-magnetic toner particles 102b, collision force, electrostatic force, and contact force are analyzed without considering the magnetic moment or the magnetic force. (For example, refer to JP-A-2001-141638.)

Further, the sum totals SUM_Magnet, SUM_Sta ele, and SUM_Contact found for the magnetic interaction, the electrostatic interaction, and the mechanical interaction (contact force) are added together to find the sum total SUM_Total (S212_Total).

Next, using the sum total SUM_Total of the magnetic interaction, the electrostatic interaction, and the mechanical interaction (contact force), the equation of motion of each particle is solved and the position coordinates are calculated (S214). The position coordinates of each particle thus found are sent to the specific processor relating to the interaction matrix and calculation information is updated (S216). After this, the process returns to step S210_Magnet and similar processing is repeated until a predetermined calculation step is reached (S218).

Thus, according to the processing procedure in the first example, the sum totals of the magnetic interaction, the electrostatic interaction, and the mechanical interaction (contact force) are found separately and sequentially using the corresponding force matrixes and then are added together to find the sum total SUM_Total collectively representing the plural interactions, so that the plural interactions can be considered at the same time for conducting particle behavior analysis.

In the parallel processing of particle calculation involving the plural types of interactions, the processor-to-processor communication amount can be decreased according to the algorithm using the force matrixes and high paralleling performance can be accomplished. In communications between the parallel computers, the force decomposition paralleling method with small communication amount provides a larger effect in terms of the processing speed.

Force Decomposition Parallel Processing

Detailed Example 2

Figure 20:
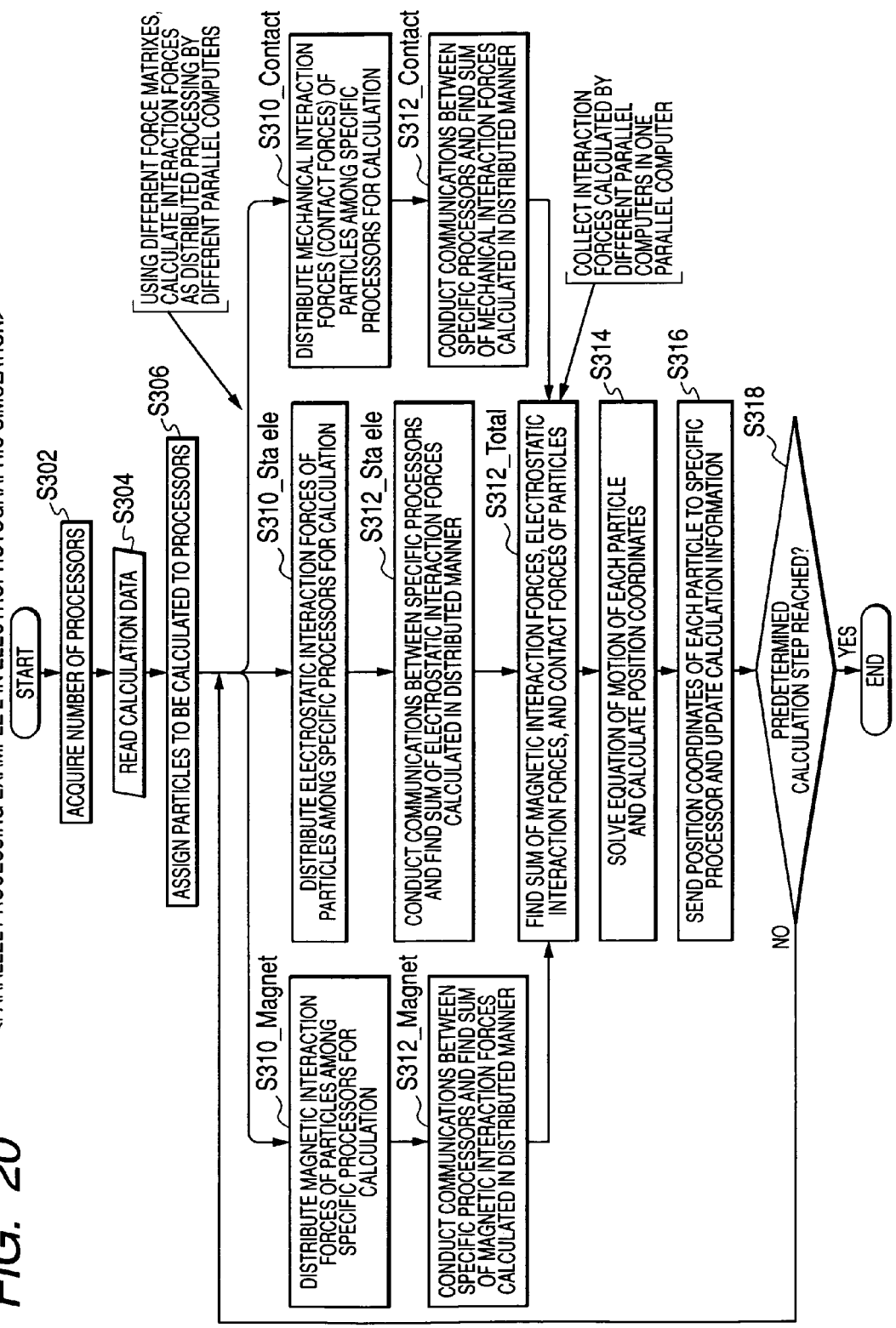
FIG. 20 is a flowchart to show a second example of force decomposition paralleling processing procedure.

FIG. 20 is a flowchart to describe paralleling processing of the force decomposition method (algorithm using a force matrix) applied in the particle behavior analysis processing of this exemplary embodiment. FIG. 20 shows a second example of the detailed force decomposition parallel processing procedure of performing analysis processing of the magnetic interaction, the electrostatic interaction, or the mechanical interaction (contact force) using a separate force matrix about the developer 102 (more particularly, the carrier particles 102a and the toner particles 102b) used in electrophotography (parallel processing example 2 in electrophotographic simulation).

The processing procedure in the second example is characterized in that the particle behavior analysis system 201 of the second exemplary embodiment shown in FIG. 3 analyzes the magnetic interaction, the electrostatic interaction, and the mechanical interaction (contact force) in parallel in different particle behavior analysis systems 200 using separate force matrixes about the developer 102 (more particularly, the carrier particles 102a and the toner particles 102b).

That is, the processing procedure is characterized in that in a system environment made up of plural parallel computers (particle behavior analysis systems 200) and a communication network (network 209) for connecting the particle behavior analysis systems 200 (typically, grid computer system), the force decomposition paralleling processing algorithm is applied for performing plural types of interaction calculations in parallel in different parallel computers (particle behavior analysis systems 200), namely, the different parallel computers perform distributed processing of interactions. Accordingly, particle behavior analysis calculations of plural types of interactions using force matrixes can be executed concurrently.

The parallel computers (particle behavior analysis systems 200) may be of different models or may be of the same model. They may have the same processing capability regardless of whether the parallel computers are of different models or the same model; or they may have different processing capabilities.

Like the detailed procedure in the first example, the processing procedure in the second example is characterized in that particles on which each processor focuses attention are assigned regardless of whether the particles are the carrier particles 102a or the toner particles 102b making up the developer 102.

Specifically, to begin with, the main particle behavior analysis apparatus 202a of the main particle behavior analysis system 200a determines the number of the particle behavior analysis apparatuses 202 (the number of processors) making up the particle behavior analysis systems 200 that can be used for particle behavior analysis processing at present (S302). Then, calculation conditions of various physical parameters required for calculation, the initial placement of particles, the number of particles to be analyzed required particularly in the force decomposition method, etc., are read (S304). The particle behavior analysis apparatuses 202 (processors) determined at step S302 are placed as a matrix as shown in FIG. 7 and the particles to be analyzed (the carrier particles 102a and the toner particles 102b making up the developer 102) are assigned (S306).

Next, plural types of multiparticle interaction forces are distributed among the specific processors for calculation. At this time, the different parallel computers (in the example, the particle behavior analysis systems 200) perform distributed processing of plural types of multiparticle interactions (perform concurrent analysis processing), and the particle behavior analysis systems 200 conduct particle behavior analysis using different force matrixes as in the first exemplary embodiment.

For example, the main particle behavior analysis system 200a performs analysis processing of the magnetic interaction with the mated particle in the matrix in charge using the force matrix for magnetic interaction analysis (S310_Magnet). Next, the specific processors communicate with each other for finding the sum total SUM_Magnet of the magnetic interaction forces calculated in the distributed manner for the magnetic interaction (S312_Magnet).

Likewise, the sub particle behavior analysis system 200b performs analysis processing of the electrostatic interaction with the mated particle in the matrix in charge using the force matrix for electrostatic interaction analysis (S310_Sta ele). Next, the specific processors communicate with each other for finding the sum total SUM_Sta ele of the electrostatic interaction forces calculated in the distributed manner for the electrostatic interaction (S312_Sta ele).

The sub particle behavior analysis system 200b performs analysis processing of the mechanical interaction (contact force) with the mated particle in the matrix in charge using the force matrix for mechanical interaction analysis (S310_Contact). Next, the specific processors communicate with each other for finding the sum total SUM_Contact of the mechanical interaction forces calculated in the distributed manner for the mechanical interaction (S312_Contact).

Further, for example, the main particle behavior analysis system 200a adds together the sum totals SUM_Magnet, SUM_Sta ele, and SUM_Contact found for the magnetic interaction, the electrostatic interaction, and the mechanical interaction (contact force) to find the sum total SUM_Total (S312_Total). This means that one parallel computer combines the calculation results of the magnetic interaction forces, the electrostatic interaction forces, and the mechanical contact forces by the different parallel computers into one.

Next, using the sum total SUM_Total of the magnetic interaction, the electrostatic interaction, and the mechanical interaction (contact force), the main particle behavior analysis system 200a solves the equation of motion of each particle and calculates the position coordinates (S314). The position coordinates of each particle thus found are sent to the specific processor relating to the interaction matrix and calculation information is updated (S316). After this, the process returns to steps S310_Magnet, S310_Sta ele, and S310_Contact and similar processing is repeated until a predetermined calculation step is reached (S318).

Another sub particle behavior analysis system 200b3 may be added to the system configuration of the second exemplary embodiment shown in FIG. 3, so that the sum totals SUM about the interactions may be sent from the main particle behavior analysis system 200a and the sub particle behavior analysis systems 200b1 and 200b2 to the sub particle behavior analysis system 200b3, which may then find the sum total SUM_Total and solve the equation of motion.

Thus, according to the detailed procedure in the second example, the sum totals of the magnetic interaction, the electrostatic interaction, and the mechanical interaction (contact force) are found concurrently using the separate force matrixes by the separate parallel computers and then are added together to find the sum total SUM_Total collectively representing the plural interactions, so that the plural interactions can be considered at the same time for conducting particle behavior analysis as with the detailed procedure in the first example.

As the plural parallel computers (in the example, the particle behavior analysis systems 200) perform distributed processing, concurrent analysis processing on the different interactions can be performed, so that it is made possible to shorten the processing time more than that in the detailed procedure in the first example.

Since the plural types of interactions are separately analyzed using the separate parallel computer systems, the parallel computes to be used can be selected based on the processing capability of each parallel computer in response to the degree of the particle interaction calculation load.

In a system environment in which the particle behavior analysis systems 200 differ in processing performance, namely, different models of parallel computers are mixed, the interaction that each parallel computer takes charge of is assigned considering the analysis processing burden difference between the interactions such as the magnetic interaction, the electrostatic interaction, and the mechanical interaction (contact force), so that the particle behavior analysis processing can be performed efficiently using the processing performance of each parallel computer.

Force Decomposition Parallel Processing

Detailed Example 3

Figure 21:
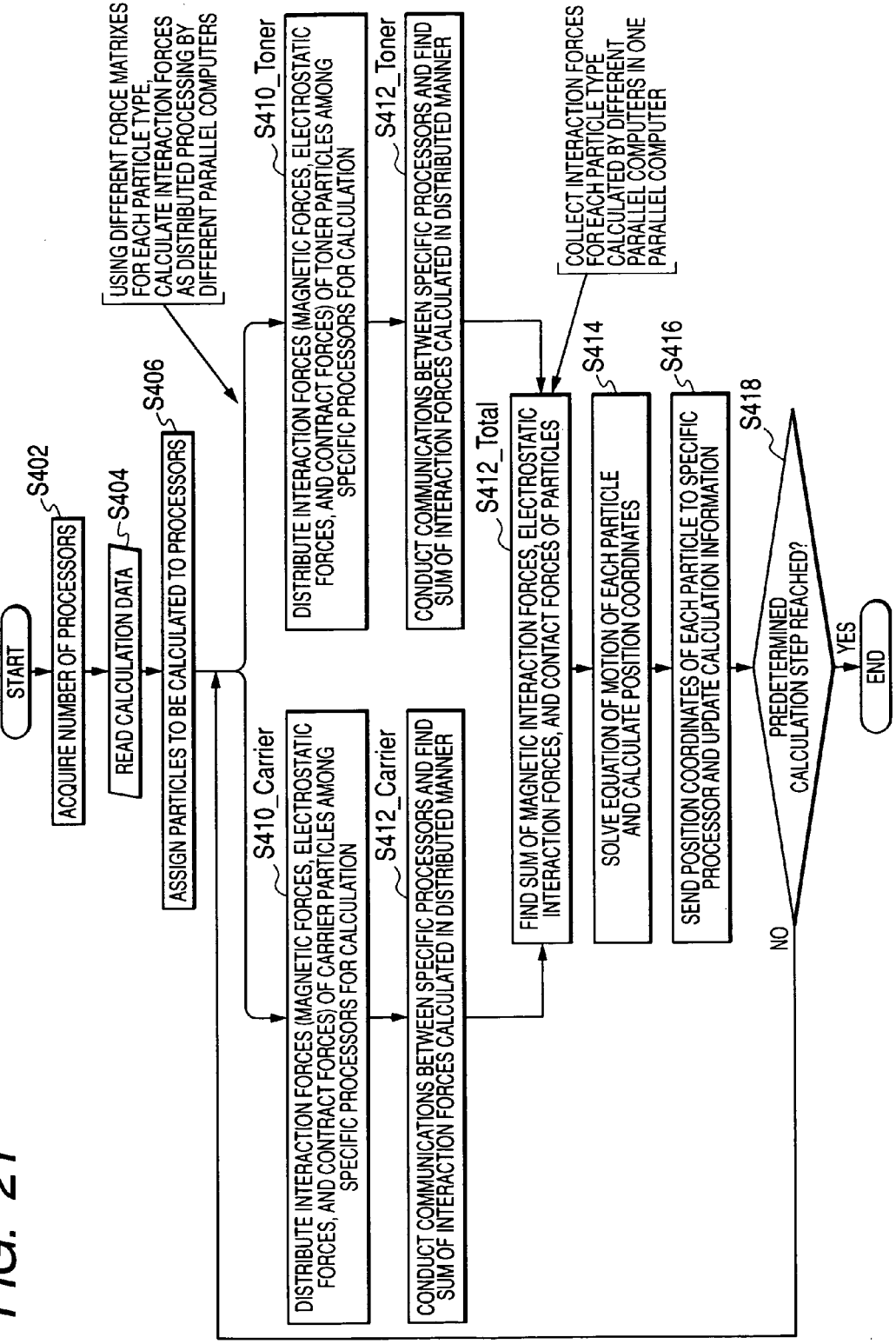
FIG. 21 is a flowchart to show a third example of force decomposition paralleling processing procedure.

FIG. 21 is a flowchart to describe paralleling processing of the force decomposition method (algorithm using a force matrix) applied in the particle behavior analysis processing of this exemplary embodiment. FIG. 21 shows a third example of the detailed force decomposition parallel processing procedure of performing analysis processing of the magnetic interaction, the electrostatic interaction, or the mechanical interaction (contact force) using a separate force matrix about the developer 102 (more particularly, the carrier particles 102a and the toner particles 102b) used in electrophotography (parallel processing example 3 in electrophotographic simulation).

Like the detailed procedure in the second example, the processing procedure in the third example is characterized in that the particle behavior analysis system 201 of the second exemplary embodiment shown in FIG. 3 analyzes the magnetic interaction, the electrostatic interaction, and the mechanical interaction (contact force) in parallel in different particle behavior analysis systems 200 using separate force matrixes about the developer 102 (more particularly, the carrier particles 102a and the toner particles 102b).

Unlike the detailed procedure in the first or second example, the processing procedure in the third example is characterized in that separate parallel computers perform concurrent particle behavior analysis processing using separate force matrixes about the magnetic interaction, the electrostatic interaction, or the mechanical interaction (contact force) for each type of the carrier particles 102a and the toner particles 102b making up the developer 102. This means that the processing procedure is characterized in that a force matrix is given for each particle type and separate parallel computers perform analysis processing.

Specifically, to begin with, the main particle behavior analysis apparatus 202a of the main particle behavior analysis system 200a determines the number of the particle behavior analysis apparatuses 202 (the number of processors) making up the particle behavior analysis systems 200 that can be used for particle behavior analysis processing at present (S402). Then, calculation conditions of various physical parameters required for calculation, the initial placement of particles, the number of particles to be analyzed required particularly in the force decomposition method, etc., are read (S404). The particle behavior analysis apparatuses 202 (processors) determined at step S402 are placed as a matrix as shown in FIG. 7 and the particles to be analyzed (the carrier particles 102a and the toner particles 102b making up the developer 102) are assigned (S406).

Next, plural types of multiparticle interaction forces are distributed among the specific processors for calculation. At this time, the different particle behavior analysis systems 200 perform distributed processing (perform concurrent analysis processing) for each type of the carrier particles 102a and the toner particles 102b (namely, for each particle type), and the particle behavior analysis systems 200 conduct particle behavior analysis using different force matrixes as in the first exemplary embodiment.

For example, the main particle behavior analysis system 200a takes charge of the carrier particles 102a as the particles in charge. The main particle behavior analysis system 200a distributes plural types of multiparticle interaction forces with mated particle in the force matrix for the carrier particles 102a among the specific processors for calculation (S410_Carrier) as with the detailed procedure in the first example.

At this time, for the plural types of multiparticle interaction forces, different force matrixes are used for calculation. The specific processors communicate with each other for finding the sum total SUM_Carrier of the interaction forces calculated in the distributed manner for each interaction (S412_Carrier). The sum total SUM_Carrier results from adding the sum totals SUM_Manget, the SUM_Sta ele, and SUM_Contact found about the magnetic interaction, the electrostatic interaction, and the mechanical interaction (contact force) about the carrier particles 102a.

The sub particle behavior analysis system 200b1 takes charge of the toner particles 102b as the particles in charge. The sub particle behavior analysis system 200a distributes plural types of multiparticle interaction forces with mated particle in the force matrix for the toner particles 102b among the specific processors for calculation (S410_Toner) as with the detailed procedure in the first example.

At this time, for the plural types of multiparticle interaction forces, different force matrixes are used for calculation. The specific processors communicate with each other for finding the sum total SUM_Toner of the interaction forces calculated in the distributed manner for each interaction (S412_Toner). The sum total SUM_Toner results from adding the sum totals SUM_Manget, the SUM_Sta ele, and SUM_Contact found about the magnetic interaction, the electrostatic interaction, and the mechanical interaction (contact force) about the toner particles 102b.

Further, the main particle behavior analysis system 200a (or the sub particle behavior analysis system 200b2) adds together the sum totals of the magnetic interaction forces, the electrostatic interaction forces, and the mechanical contract forces found for the carrier particles 102a and the toner particles 102b, namely, the sum totals SUM_Carrier and SUM_Toner to find the sum total SUM_Total (S412_Total). That is, one parallel computer combines the calculation results of the different parallel computers about the carrier particles 102a and the toner particles 102b into one.

Next, using the sum total SUM_Total of the carrier particles 102a and the toner particles 102b, the main particle behavior analysis system 200a (or the sub particle behavior analysis system 200b2) solves the equation of motion of each particle and calculates the position coordinates (S414). The position coordinates of each particle thus found are sent to the specific processor relating to the interaction matrix and calculation information is updated (S416). After this, the process returns to steps S410_Carrier and S410_Toner and similar processing is repeated until a predetermined calculation step is reached (S418).

Thus, according to the detailed procedure in the third example, the sum totals of the interactions are found concurrently using the separate force matrixes by the separate parallel computers for each type of the particles making up the developer 102 and then are added together to find the sum total SUM_Total collectively representing the plural interactions, so that the plural interactions can be considered at the same time for conducting particle behavior analysis as with the detailed procedure in the first or second example.

To consider the plural interactions at the same time, the interactions to be analyzed can be narrowed down easily in response to the characteristic of the particle type. Since the interaction between different types of particles need not be considered, the analysis processing can be facilitated as a whole.

As the plural parallel computers (in the example, the particle behavior analysis systems 200) perform distributed processing, concurrent analysis processing of plural types of interactions can be performed about each particle type. The procedure of giving force matrixes for each particle type and performing the particle behavior analysis processing can also be applied to the detailed procedure in the first example in which analysis is sequentially conducted on the magnetic interaction, the electrostatic interaction, and the mechanical interaction (contact force). However, the detailed procedure in the third example makes it possible to shorten the processing time because the plural types of interactions can be concurrently analyzed by performing distributed processing about each particle type.

Since the plural types of interactions are separately analyzed using the separate parallel computer systems for each particle type, the parallel computes to be used can be selected based on the processing capability of each parallel computer in response to the degree of the particle interaction calculation load for each particle type.

In a system environment in which the particle behavior analysis systems 200 differ in processing performance, namely, different models of parallel computers are mixed, the particle type that each parallel computer takes charge of is assigned considering the analysis processing burden difference between the particle types, so that the particle behavior analysis processing can be performed efficiently using the processing performance of each parallel computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A particle position analysis method that uses a plurality of computers connected via a network to analyze behavior of a plurality of toner particles considering an interaction force with a different substance acting on the toner particles, comprising:

analyzing behavior of the toner particles by using a force decomposition paralleling algorithm using a plurality of force matrices considering at least two or more types of interaction forces;

determining a number of the plurality of computers to be used as particle behavior position analysis apparatuses;

reading calculation conditions of physical parameters;

assigning each of toner particles to be analyzed to one of the plurality of computers;

analyzing, by the plurality of computers, a first type of interaction force using a force matrix of the first type of interaction force;

communicating, between the plurality of computers, to calculate a sum of the first type of interaction forces;

analyzing, by the plurality of computers, a second type of interaction force using a force matrix of the second type of interaction force;

communicating, between the plurality of computers, to calculate a sum of the second type of interaction forces;

calculating a sum of all interaction forces;

solving the equation of motion for each toner particle to be analyzed and calculating position coordinates of each toner particle to be analyzed; and sending the position coordinates of each toner particle to the processor to which the toner particle is assigned and updating calculation information.

2. A particle position analysis apparatus for using a plurality of computers connected via a network to analyze behavior of a plurality of toner particles considering an interaction force with a different substance acting on the toner particles, the particle position analysis apparatus comprising:

a data processing section that is configured to perform the following:

analyze behavior of the toner particles using a force decomposition paralleling algorithm using a plurality of force matrices considering at least two or more types of interaction forces;

determine a number of the plurality of computers to be used as particle position analysis apparatuses;

read calculation conditions of physical parameters;

assign each of toner particles to be analyzed to one of the plurality of computers;

analyze, by the plurality of computers, a first type of interaction force using a force matrix of the first type of interaction force;

communicate, between the plurality of computers, to calculate a sum of the first type of interaction forces;

analyze, by the plurality of computers, a second type of interaction force using a force matrix of the second type of interaction force;

communicate, between the plurality of computers, to calculate a sum of the second type of interaction forces;

calculate a sum of all interaction forces;

solve the equation of motion for each toner particle to be analyzed and calculate position coordinates of each toner particle to be analyzed; and send the position coordinates of each toner particle to the processor to which the toner particle is assigned and update calculation information.

3. The particle position analysis apparatus as claimed in claim 2, wherein the data processing section analyzes the behavior of one particle and analyzes the behavior of another particle different from the one particle in at least one of physical properties and particle diameter based on the analyzed behavior of the one particle, the behavior of the another particle containing an interaction with the one particle.

4. The particle position analysis apparatus as claimed in claim 2, wherein the data processing section finds a sum total of interaction forces of one type acting on the particle using one force matrix, finds the sum total of interaction forces of another type acting on the particle using a different force matrix from the one force matrix, and calculates a sum of the sum total of interaction forces of the one type and the sum total of interaction forces of the another type, so as to analyze the behavior of the particle considering the plural types of interaction forces.

5. The particle position analysis apparatus as claimed in claim 4, wherein the data processing section sequentially finds the sum total of interaction forces of the one type and the sum total of interaction forces of the another type using one set of the plurality of computers.

6. The particle position analysis apparatus as claimed in claim 4, wherein the data processing section concurrently finds the sum total of interaction forces of the one type and the sum total of interaction forces of the another type using two or more sets of the plurality of computers.

7. The particle position analysis apparatus as claimed in claim 4, wherein the data processing section finds the sum total of the plural types of interaction forces acting on the one particle, finds the sum total of the plural types of interaction forces acting on the another particle, and calculates the sum of the sum total of the plural types of interaction forces acting on the one particle and the sum total of the plural types of interaction forces acting on the another particle, so as to analyze the behavior of the plural types of particles considering the plural types of interaction forces.

8. The particle position analysis apparatus as claimed in claim 7, wherein the data processing section concurrently finds the sum total of the plural types of interaction forces acting on the one particle and the sum total of the plural types of interaction forces acting on the another particle using two or more sets of the plurality of computers.

9. A non-transitory computer readable storage medium storing a particle position analysis program that uses a plurality of computers connected via a network to analyze behavior of a plurality of toner particles considering an interaction force with a different substance acting on the toner particles using a force decomposition paralleling algorithm using a plurality of force matrices, the program causing the plurality of computers to execute:

analyzing behavior of the toner particles by using a force decomposition paralleling algorithm using a plurality of force matrices considering at least two or more types of interaction forces;

determining a number of the plurality of computers to be used as particle position analysis apparatuses;

reading calculation conditions of physical parameters;

assigning each of toner particles to be analyzed to one of the plurality of computers;

analyzing, by the plurality of computers, a first type of interaction force using a force matrix of the first type of interaction force;

communicating, between the plurality of computers, to calculate a sum of the first type of interaction forces;

analyzing, by the plurality of computers, a second type of interaction force using a force matrix of the second type of interaction force;

communicating, between the plurality of computers, to calculate a sum of the second type of interaction forces;

calculating a sum of all interaction forces;

solving the equation of motion for each toner particle to be analyzed and calculating position coordinates of each toner particle to be analyzed; and sending the position coordinates of each toner particle to the processor to which the toner particle is assigned and updating calculation information.

* * * * *